(12) United States Patent
Fujimaki

(10) Patent No.: US 11,536,964 B2
(45) Date of Patent: *Dec. 27, 2022

(54) HEAD-MOUNTED DISPLAY APPARATUS, DISPLAY CONTROL METHOD, AND COMPUTER PROGRAM

(71) Applicant: SEIKO EPSON CORPORATION, Tokyo (JP)

(72) Inventor: Yutaka Fujimaki, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 212 days.

This patent is subject to a terminal disclaimer.

(21) Appl. No.: 17/070,397

(22) Filed: Oct. 14, 2020

(65) Prior Publication Data

US 2021/0026145 A1  Jan. 28, 2021

Related U.S. Application Data

(63) Continuation of application No. 16/299,568, filed on Mar. 12, 2019, now Pat. No. 10,838,215.

(30) Foreign Application Priority Data

Mar. 13, 2018 (JP) .............................. JP2018-045023

(51) Int. Cl.
*H04N 13/332* (2018.01)
*G02B 27/01* (2006.01)
(Continued)

(52) U.S. Cl.
CPC ......... *G02B 27/0172* (2013.01); *G06F 3/013* (2013.01); *G06F 3/04886* (2013.01); *H04N 13/332* (2018.05); *H04N 13/383* (2018.05)

(58) Field of Classification Search
CPC ............. G02B 27/0172; H04N 13/332; H04N 13/383; G06F 3/013; G06F 3/04886
See application file for complete search history.

(56) References Cited

U.S. PATENT DOCUMENTS

2012/0206816 A1* 8/2012 Yoshida ............... G02B 27/145
359/630
2012/0242560 A1* 9/2012 Nakada ................... G06F 3/041
345/8

(Continued)

FOREIGN PATENT DOCUMENTS

JP  H08-223609 A   8/1996
JP  H09-331552 A  12/1997
(Continued)

*Primary Examiner* — Temesghen Ghebretinsae
*Assistant Examiner* — Sosina Abebe
(74) *Attorney, Agent, or Firm* — Oliff PLC

(57) ABSTRACT

Provided is a head-mounted display apparatus including: a display unit configured to display each of virtual screens that is set to each of a plurality of predetermined focal lengths; a distance-specific image generation unit configured to generate distance-specific display images for displaying, on the virtual screens, a display object representing an object to be displayed present between two focal lengths next to each other of the plurality of focal lengths; and a display controller configured to display each of the generated distance-specific display images on the virtual screen.

7 Claims, 16 Drawing Sheets

(51) Int. Cl.
*G06F 3/04886* (2022.01)
*H04N 13/383* (2018.01)
*G06F 3/01* (2006.01)

(56) References Cited

U.S. PATENT DOCUMENTS

| | | | | |
|---|---|---|---|---|
| 2012/0242677 | A1* | 9/2012 | Kobayashi | G09G 3/003 |
| | | | | 345/589 |
| 2015/0279110 | A1* | 10/2015 | Kimura | G06T 19/006 |
| | | | | 345/633 |
| 2016/0363770 | A1* | 12/2016 | Kim | G02B 27/0093 |
| 2018/0239136 | A1 | 8/2018 | Ishikawa et al. | |

FOREIGN PATENT DOCUMENTS

| | | |
|---|---|---|
| JP | 2002-196280 A | 7/2002 |
| JP | 2010-139589 A | 6/2010 |
| JP | 2016-171550 A | 9/2016 |

\* cited by examiner

HEAD-MOUNTED DISPLAY APPARATUS, DISPLAY CONTROL METHOD, AND COMPUTER PROGRAM

CROSS REFERENCE TO RELATED APPLICATION

This application is a continuation of application Ser. No. 16/299,568, filed Mar. 12, 2019, the contents of which are incorporated herein by reference.

BACKGROUND

1. Technical Field

The invention relates to a head-mounted display apparatus.

2. Related Art

As a head-mounted display apparatus (Head Mounted Display (HMD)) to be worn by a user on the head to display images and the like within the user's visual field, a transmission-type head-mounted display apparatus is known that allows an external scene to be transmissively viewed along with display images. When the external scene and the display images are overlaid for displaying in the transmission-type head-mounted display apparatus, an optical mismatch resulting from a deviation in angle of convergence and a deviation in focal length between the external scene and the display images may occur. As a result, the user may experience an eye strain or a discomfort. Thus, there have been, in the related art, proposed various technologies for reducing the optical mismatch in the transmission-type head-mounted display apparatus. For example, in JP-A-2010-139589, a technology is proposed which allows an angle of convergence of a video display unit to be modified according to a point-of-fixation distance of a user wearing the transmission-type head-mounted display apparatus.

However, in the technology described in JP-A-2010-139589, in reality, there is room for improvement in terms of focal length. For example, when the video display unit described in JP-A-2010-139589 is moved in a sight direction of a user according to the point-of-fixation distance of the user, the problem is that it is not possible to simultaneously display display images of a plurality of objects to be displayed present at locations having different point-of-fixation distances, and when the point of fixation of the user moves, a display delay may occur. Such a problem is not only found in the transmission-type head-mounted display apparatus but also in a head-mounted display apparatus which blocks transmittance of the external scene.

SUMMARY

According to an exemplary embodiment of the invention, a head-mounted display apparatus is provided. The head-mounted display apparatus includes a display unit configured to display each of virtual screens that is set to each of a plurality of predetermined focal lengths, a distance-specific image generation unit configured to generate distance-specific display images for displaying, on the virtual screens, a display object representing an object to be displayed present between two focal lengths next to each other of the plurality of focal lengths, and a display controller configured to display each of the generated distance-specific display images on the virtual screen corresponding to a focal length far in a direction of a field of view of a user wearing the head-mounted display apparatus, out of the two focal lengths next to each other.

BRIEF DESCRIPTION OF THE DRAWINGS

The invention will be described with reference to the accompanying drawings, wherein like numbers reference like elements.

FIG. 14 is an explanatory diagram schematically illustrating a user's field of view if a first distance-specific display image is fixated on.

FIG. 15 is an explanatory diagram schematically illustrating a user's field of view if a second distance-specific display image is fixated on.

FIG. 16 is an explanatory diagram schematically illustrating a user's field of view if a third distance-specific display image is fixated on.

FIG. 21 is an explanatory diagram schematically illustrating a user's field of view after execution of step S135a.

DESCRIPTION OF EXEMPLARY EMBODIMENTS

A. First Exemplary Embodiment

A1. Overall Configuration of Head-Mounted Display Apparatus

Figure 1:
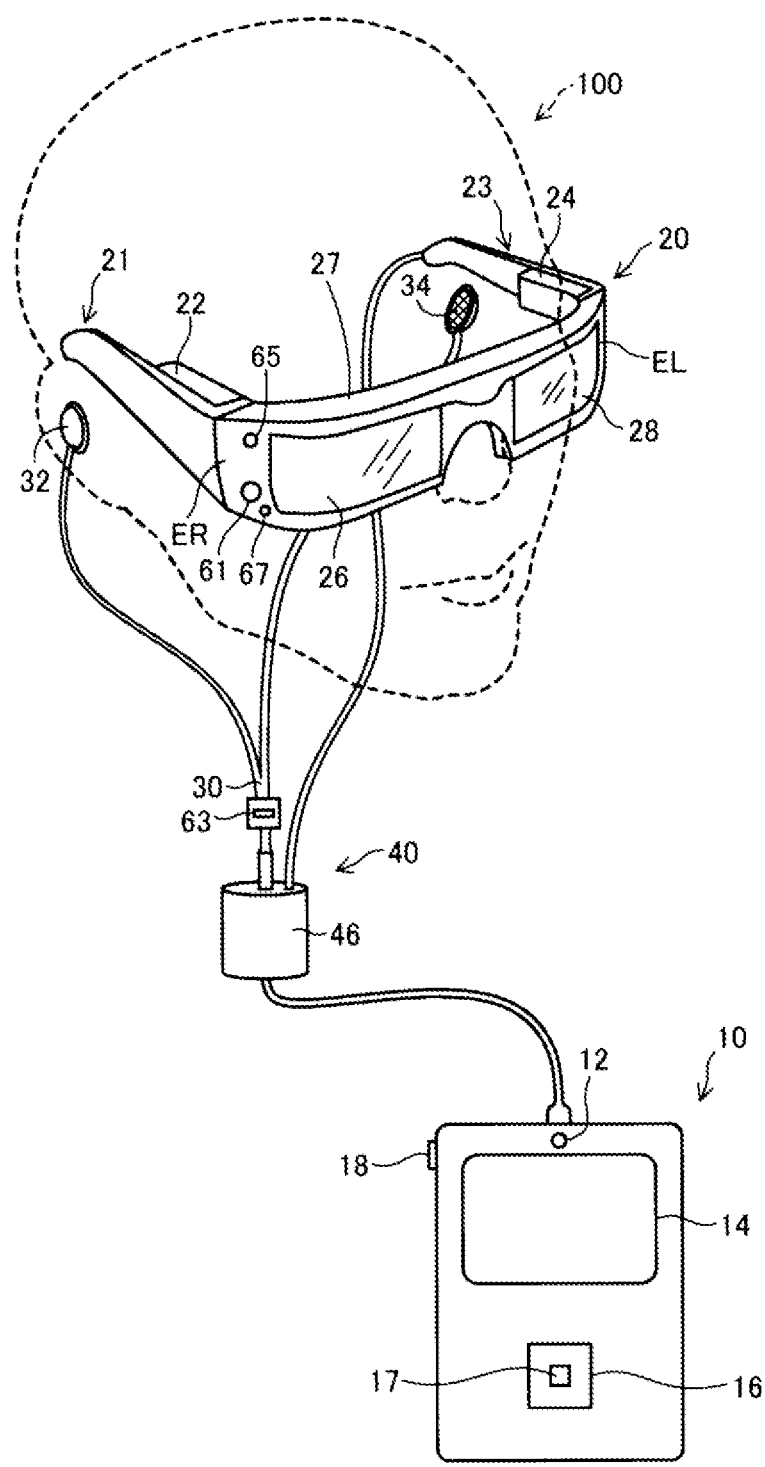
FIG. 1 is an explanatory diagram illustrating a schematic configuration of a head mounted display apparatus according to an exemplary embodiment of the present invention.

FIG. 1 is an explanatory diagram illustrating a schematic configuration of a head mounted display apparatus 100 according to an exemplary embodiment of the invention. The head mounted display apparatus 100 is a display apparatus to be mounted on a user's head and is also referred to as a Head Mounted Display (HMD). The HMD 100 is a see-through (transmission-type) head mounted display apparatus that provides an image appearing in an external scene viewed through glasses.

The HMD 100 includes a display unit 20 configured to allow the user to view images and a control device 10 configured to control the display unit 20.

The display unit 20 is a head-mounted body to be worn by the user on the head and has an eyeglasses-like shape in the exemplary embodiment. In the exemplary embodiment, the display unit 20 is set with a virtual screen for each of a plurality of predetermined focal lengths. The display unit 20 includes a support body including a right holding portion 21, a left holding portion 23, and a front frame 27 and further includes, on the support body, a right display unit 22, a left display unit 24, a right light-guiding plate 26, and a left light-guiding plate 28.

The right holding portion 21 and the left holding portion 23 respectively extend rearward from ends of the front frame 27 to hold the display unit 20 on the user's head in a manner similar to the temples of a pair of eyeglasses. Here, one of both the ends of the front frame 27 located on the right side of the user when the user wears the display unit 20 is referred to as an end ER, and the other end located on the left side of the user when the user wears the display unit 20 is referred to as an end EL. The right holding portion 21 is provided to extend from the end ER of the front frame 27 to a position corresponding to the right temple of the user when the user wears the display unit 20. The left holding portion 23 is provided to extend from the end EL of the front frame 27 to a position corresponding to the left temple of the user when the user wears the display unit 20.

The right light-guiding plate 26 and the left light-guiding plate 28 are provided in the front frame 27. The right light-guiding plate 26 is positioned in front of the right eye of the user, when the user wears the display unit 20, to allow the right eye to view an image. The left light-guiding plate 28 is positioned in front of the left eye of the user, when the user wears the display unit 20, to allow the left eye to view an image.

The front frame 27 has a shape connecting an end of the right light-guiding plate 26 and an end of the left light-guiding plate 28 with each other. The position of the connection corresponds to a position between eyebrows of the user when the user wears the display unit 20. The front frame 27 may include a nose pad portion that is provided at the position of connection between the right light-guiding plate 26 and the left light-guiding plate 28, and that is in contact with the nose of the user when the user wears the display unit 20. In this case, the nose pad portion, the right holding portion 21, and the left holding portion 23 allow the display unit 20 to be held on the head of the user. A belt may also be attached to the right holding portion 21 and the left holding portion 23 that fits to the back of the head of the user when the user wears the display unit 20. In this case, the belt allows the display unit 20 to be firmly held on the head of the user.

The right display unit 22 is configured to display images on the right light-guiding plate 26. The right display unit 22 is provided on the right holding portion 21 and lies adjacent to the right temple of the user when the user wears the display unit 20. The left display unit 24 is configured to display images on the left light-guiding plate 28. The left display unit 24 is provided on the left holding portion 23 and lies adjacent to the left temple of the user when the user wears the display unit 20.

The right light-guiding plate 26 and the left light-guiding plate 28 according to the exemplary embodiment are optical parts (e.g., prisms) formed of a light transmission-type resin or the like, and are configured to guide image light output by the right display unit 22 and the left display unit 24 to the eyes of the user. Surfaces of the right light-guiding plate 26 and the left light-guiding plate 28 may be provided with dimmer plates. The dimmer plates are thin-plate optical elements having a different transmittance for a different wavelength range of light, and function as so-called wavelength filters. The dimmer plates are arranged to cover a surface of the front frame 27 (a surface opposite to a surface facing the eyes of the user), for example. Appropriate selection of optical properties of the dimmer plates allows the transmittance of light to a desired wavelength range, such as visible light, infrared light, and ultraviolet light to be adjusted, and allows the amount of outside light entering the right light-guiding plate 26 and the left light-guiding plate 28 and passing through the right light-guiding plate 26 and the left light-guiding plate 28 to be adjusted.

The display unit 20 guides image light generated by the right display unit 22 and the left display unit 24 to the right light-guiding plate 26 and the left light-guiding plate 28, respectively, to allow the user to view, by the image light, an image (Augmented Reality (AR) image) along with scenery in an outside world viewed through the display unit 20 (this is also referred to as "display an image"). When the outside light traveling from the front of the user passes through the right light-guiding plate 26 and the left light-guiding plate 28 and enters the eyes of the user, the image light forming an image and the outside light enter the eyes of the user. The visibility of images viewed by the user can be affected by the intensity of the outside light.

The visibility of images may thus be adjusted, for example, by mounting dimmer plates on the front frame 27 and by appropriately selecting or adjusting the optical properties of the dimmer plates. In a typical example, dimmer plates may be selected to have a light transmittance to allow the user with the HMD 100 to view at least an external scene. The visibility of images may also be improved by suppressing sunlight. The use of the dimmer plates is also expected to be effective in protecting the right light-guiding plate 26 and the left light-guiding plate 28 to prevent, for example, damage and adhesion of dust to the right light-guiding plate 26 and the left light-guiding plate 28. The dimmer plates may be removably attached to the front frame 27 or each of the right light-guiding plate 26 and the left light-guiding plate 28. Alternatively, different types of removable dimmer plates may be provided for replacement, or alternatively the dimmer plates may be omitted.

A camera 61 is arranged on the front frame 27 of the display unit 20. The camera 61 is provided on a front surface of the front frame 27 and positioned so that the camera 61 does not block the outside light passing through the right light-guiding plate 26 and the left light-guiding plate 28. In the example in FIG. 1, the camera 61 is arranged on the end ER of the front frame 27. The camera 61 may be arranged on the end EL of the front frame 27 or at the connection between the right light-guiding plate 26 and the left light-guiding plate 28.

The camera 61 is a digital camera including an imaging lens, and an imaging element such as a charge-coupled device (CCD) and a complementary metal oxide semiconductor (CMOS). The camera 61 according to the exemplary embodiment is a monocular camera. However, a stereo camera may be adopted. The camera 61 is configured to capture an image of at least part of an external scene (real space) in front of the HMD 100, in other words, in a direction of the field of view of the user when the user wears the display unit 20. In other words, the camera 61 is configured to capture an image in a range overlapping with the field of view of the user or an image in the direction of the field of view of the user, i.e., an image in a direction of a scene viewed by the user. An angle of view of the camera 61 can be appropriately set. In the exemplary embodiment, the angle of view of the camera 61 is set to allow the camera 61 to capture the entire field of view that is visible to the user through the right light-guiding plate 26 and the left light-guiding plate 28. The camera 61 is controlled by a control function unit 150 (FIG. 7) to capture an image and output the data of the captured image to the control function unit 150.

The HMD 100 may include a distance measurement sensor configured to detect the distance to a measured object located in a predetermined measurement direction. The distance measurement sensor may be arranged at the connection between the right light-guiding plate 26 and the left light-guiding plate 28 of the front frame 27, for example. The measurement direction of the distance measurement sensor may be the front direction of the HMD 100 (a direction overlapping with an imaging direction of the camera 61). The distance measurement sensor may include, for example, a light emitting part, such as a LED or a laser diode, configured to emit light, and a light receiving part configured to receive light reflected by the object to be measured. In this case, a distance is determined by a triangulation process or a distance measurement process based on a time difference. The distance measurement sensor may include, for example, a transmission part configured to transmit ultrasonic waves and a reception part configured to receive the ultrasonic waves reflected by an object to be measured. In this case, a distance is determined by the distance measurement process based on the time difference. Like the camera 61, the distance measurement sensor measures a distance in accordance with an instruction from the control function unit 150 and outputs the result of detection to the control function unit 150.

Figure 2:
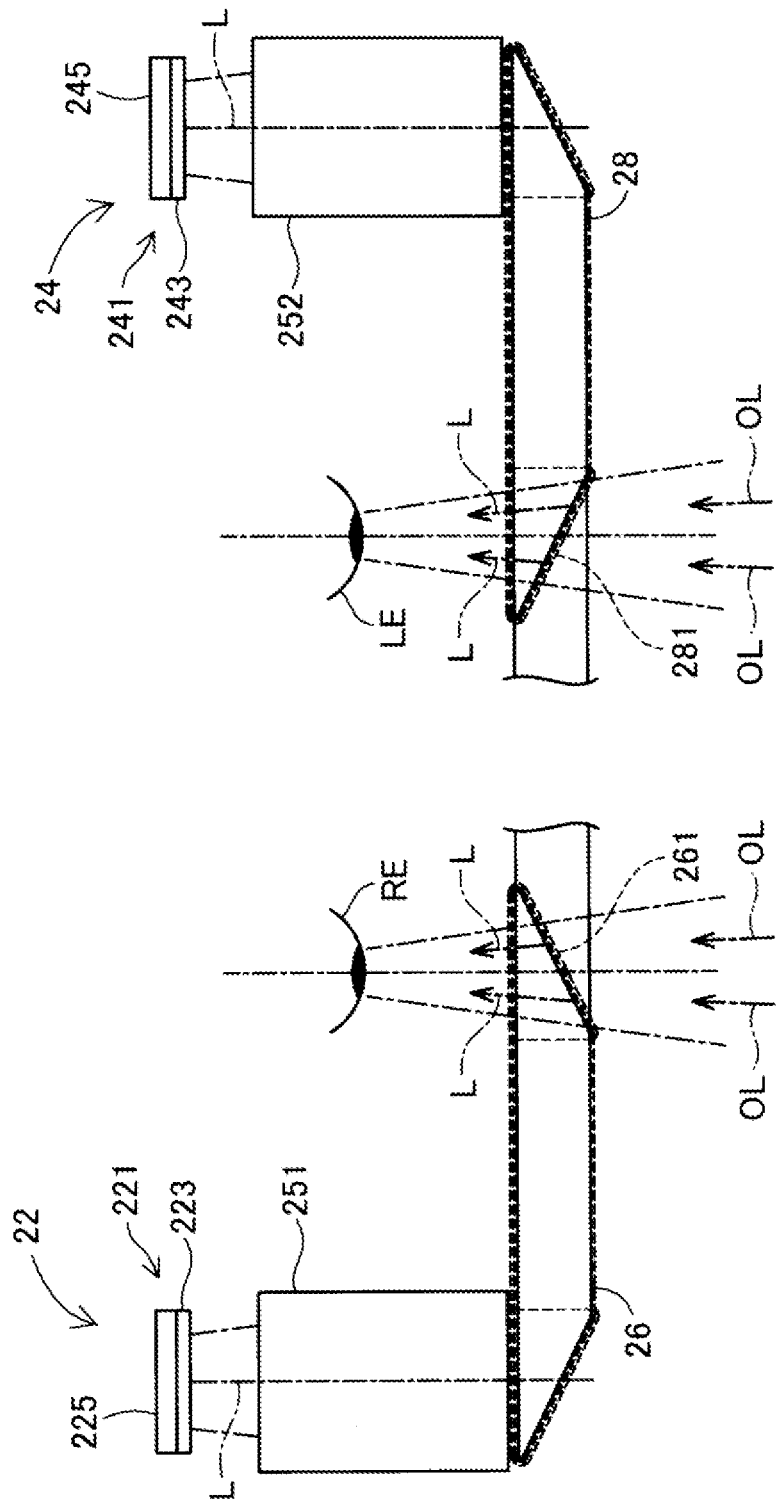
FIG. 2 is a plan view illustrating a configuration of a main part of an optical system included in a display unit.

FIG. 2 is a plan view illustrating a main part of a configuration of an optical system included in the display unit 20. For convenience of description, FIG. 2 illustrates the right eye RE and left eye LE of the user. As illustrated in FIG. 2, the right display unit 22 and the left display unit 24 are arranged symmetrically on the right- and left-hand sides.

To allow the right eye RE to view an image (AR image), the right display unit 22 includes an organic light emitting diode (OLED) unit 221 and a right optical system 251. Note that in FIG. 2, illustration of a detailed configuration of the right optical system 251 is omitted.

The OLED unit 221 is configured to emit imaging light. The OLED unit 221 includes an OLED panel 223 and an OLED drive circuit 225 configured to drive the OLED panel 223. The OLED panel 223 is a light emission type display panel including light-emitting elements configured to emit red (R) color light, green (G) color light, and blue (B) color light, respectively, by organic electro-luminescence. The OLED panel 223 includes a plurality of pixels arranged in a matrix, each of the plurality of pixels including one element of R, one element of G, and one element of B.

The OLED drive circuit 225 is controlled by the control function unit 150 (FIG. 7), which will be described later, to select and power the light-emitting elements included in the OLED panel 223 to cause the light-emitting elements to emit light. The OLED drive circuit 225 is secured by bonding or the like, for example, onto a rear face of the OLED panel 223, i.e., back of a light-emitting surface. The OLED drive circuit 225 may include, for example, a semiconductor device configured to drive the OLED panel 223, and may be mounted onto a substrate secured to the rear face of the OLED panel 223. A temperature sensor 217 (FIG. 6) described below is mounted on the substrate. The OLED panel 223 may be configured to include light-emitting elements, arranged in a matrix, that emit white color light, and color filters, disposed over the light-emitting elements, that correspond to the R color, the G color, and the B color, respectively. The OLED panel 223 may have a WRGB configuration including light-emitting elements configured to emit white (W) color light, in addition to light-emitting elements configured to emit R color light, G color light, and B color light, respectively.

Figure 3:
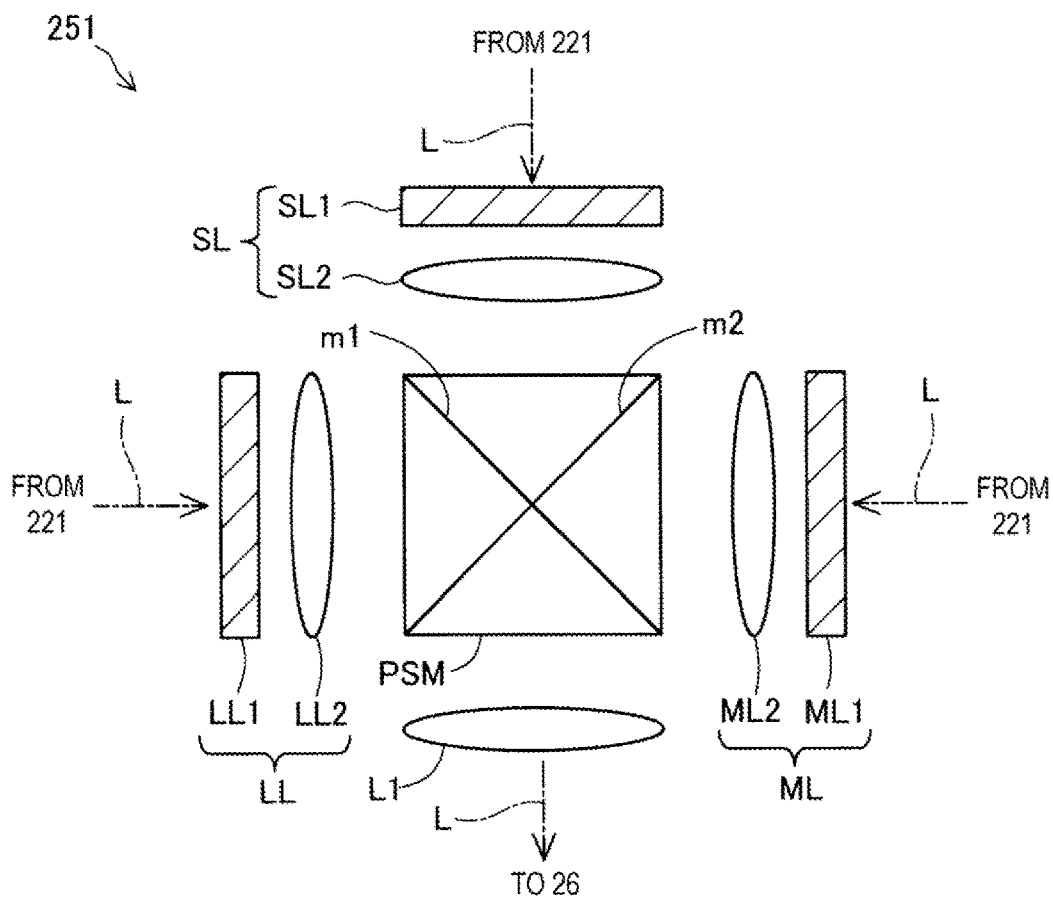
FIG. 3 is an explanatory diagram schematically illustrating a detailed configuration of a right optical system.

FIG. 3 is an explanatory diagram schematically illustrating a detailed configuration of the right optical system 251. The right optical system 251 includes optical systems SL, ML, and LL for each of the plurality of focal lengths, a prism PSM, and a projection lens L1. Imaging light L emitted from the OLED unit 221 is changed in focal length by each of the optical systems SL, ML, and LL, and then, guided to the right light-guiding plate 26 via the prism PSM and the projection lens L1. In the exemplary embodiment, three levels of a "first focal length", a "second focal length", and a "third focal length" are predetermined for the focal length.

Each of the optical systems SL, ML, and LL is configured similarly to one another. Specifically, the short-distance optical system SL includes a collimate lens SL1, and a focal length changing lens SL2. The collimate lens SL1 is disposed at the side of the OLED panel 223 illustrated in FIG. 2, and the focal length changing lens SL2 is disposed at the side of the prism PSM illustrated in FIG. 3. The collimate lens SL1 and the focal length changing lens SL2 are disposed in alignment to each other. The collimate lens SL1 converges the imaging light L emitted from the OLED unit 221 into a parallel light flux to input the imaging light L into the focal length changing lens SL2. The focal length changing lens SL2 changes the focal length of the imaging light L into the first focal length to input the imaging light L with the changed focal length into the prism PSM. In the exemplary embodiment, the first focal length is set to 50 cm.

The mid-distance optical system ML includes a collimate lens ML1, and a focal length changing lens ML2. Each of the lenses ML1 and ML2 is configured similarly to each of the lenses SL1 and SL2 of the short-distance optical system SL. The imaging light L emitted from the OLED unit 221 is converged at the collimate lens SL1 into a parallel light flux to be input into the focal length changing lens ML2. The focal length changing lens ML2 changes the focal length of the imaging light L into the second focal length to input the imaging light L with the changed focal length into the prism PSM. In the exemplary embodiment, the second focal length is set to 1 m.

The long-distance optical system LL includes a collimate lens LL1, and a focal length changing lens LL2. Each of the lenses LL1 and LL2 is configured similarly to each of the lenses SL1 and SL2 of the short-distance optical system SL. The imaging light L emitted from the OLED unit 221 is converged at the collimate lens LL1 into a parallel light flux to be input into the focal length changing lens LL2. The focal length changing lens LL2 changes the focal length of the imaging light L into the third focal length to input the imaging light L with the changed focal length into the prism PSM. In the exemplary embodiment, the third focal length is set to 2 m.

The prism PSM allows the imaging light L emitted from each of the optical systems SL, ML, and LL to enter the projection lens L1. The prism PSM is a so-called cross dichroic prism, and is configured of four rectangular prisms with its respective right angle surfaces being bonded together. At a center of the prism PSM, a first reflective membrane m1 and a second reflective membrane m2 are formed in cross. The first reflective membrane m1 totally reflects only the imaging light L emitted from the mid-distance optical system ML, toward the projection lens L1. The first reflective membrane m1 does not reflect the imaging light L emitted from the short-distance optical system SL and the long-distance optical system LL. The second reflective membrane m2 totally reflects only the imaging light L emitted from the long-distance optical system LL, toward the projection lens L1. The second reflective membrane m2 does not reflect the imaging light L emitted from the short-distance optical system SL and the mid-distance optical system ML. The imaging light L emitted from the short-distance optical system SL passes through the first reflective membrane m1 and the second reflective membrane m2 to directly enter the projection lens L1.

The projection lens L1 converges a plurality of imaging light beams L, emitted from the prism PSM, with different focal lengths from each other, into a parallel light flux, to emit the beams to the right light-guiding plate 26. Note that the projection lens L1 may be omitted.

As described above, when each of the optical systems SL, ML, and LL and the prism PSM are utilized to guide, to the right light-guiding plate 26, the imaging light L emitted from the OLED unit 221, a virtual screen can be set to each of the first focal length, the second focal length, and the third focal length in the display unit 20. In the following description, the virtual screen corresponding to the first focal length is referred to as a "first virtual screen", the virtual screen corresponding to the second focal length is referred to as a "second virtual screen", and the virtual screen corresponding to the third focal length is referred to as a "third virtual screen".

In an optical path configured to guide light inside the right light-guiding plate 26, a plurality of reflective faces configured to reflect the imaging light L is formed. The imaging light L is reflected multiple times inside the right light-guiding plate 26 and then, is guided to the right eye RE side. In the right light-guiding plate 26, a half mirror 261 (reflective face) located in front of the right eye RE is formed. The image light L reflected by the half mirror 261 is emitted from the right light-guiding plate 26 to the right eye RE. The image light L forms an image on the retina of the right eye RE to allow the user to view the image.

To allow the left eye LE to view an image (AR image), the left display unit 24 includes an OLED unit 241 and a left optical system 252. The OLED unit 241 is configured to emit imaging light. The left optical system 252 includes a lens group and the like, and is configured to guide, to the left light-guiding plate 28, imaging light L emitted by the OLED unit 241. The OLED unit 241 includes an OLED panel 243 and an OLED drive circuit 245 configured to drive the OLED panel 243. For further details, the OLED unit 241, the OLED panel 243, and the OLED drive circuit 245 are the same as the OLED unit 221, the OLED panel 223, and the OLED drive circuit 225, respectively. A temperature sensor 239 (FIG. 6) is mounted on a substrate secured to a rear face of the OLED panel 243. For further details, the left optical system 252 is the same as the right optical system 251 described above.

According to the configuration described above, the HMD 100 may serve as a see-through display apparatus. That is, the imaging light L reflected by the half mirror 261 and the outside light OL passing through the right light-guiding plate 26 enter the right eye RE of the user. The imaging light L reflected by the half mirror 281 and the outside light OL passing through the left light-guiding plate 28 enter the left eye LE of the user. In this manner, the HMD 100 allows the imaging light L of the internally processed image and the outside light OL to enter the eyes of the user in an overlapped manner. As a result, the user views an external scene (real world) through the right light-guiding plate 26 and the left light-guiding plate 28 and also views a virtual image (virtual image or AR image) formed by the imaging light L overlapping the external scene.

The right optical system 251 and the right light-guiding plate 26 are also collectively referred to as a "right light-guiding unit" and the left optical system 252 and the left light-guiding plate 28 are also collectively referred to as a "left light-guiding unit". Configurations of the right light-guiding unit and the left light-guiding unit are not limited to the example described above, and any desired configuration may be adopted as long as imaging light forms an image in front of the eyes of the user. For example, diffraction gratings or translucent reflective films may be used for the right light-guiding unit and the left light-guiding unit.

In FIG. 1, the control device 10 and the display unit 20 are connected together via a connection cable 40. The connection cable 40 is removably connected to a connector provided in a lower portion of the control device 10 and connects to various circuits inside the display unit 20 through a tip of the left holding part 23. The connection cable 40 includes a metal cable or an optical fiber cable through which digital data is transmitted. The connection cable 40 may further include a metal cable through which analog data is transmitted. A connector 46 is provided in the middle of the connection cable 40.

The connector 46 is a jack to which a stereo mini-plug is connected, and is connected to the control device 10, for example, via a line through which analog voice signals are transmitted. In the example of the exemplary embodiment illustrated in FIG. 1, the connector 46 connects to a right earphone 32 and a left earphone 34 constituting a stereo headphone and to a headset 30 including a microphone 63.

Figure 6:
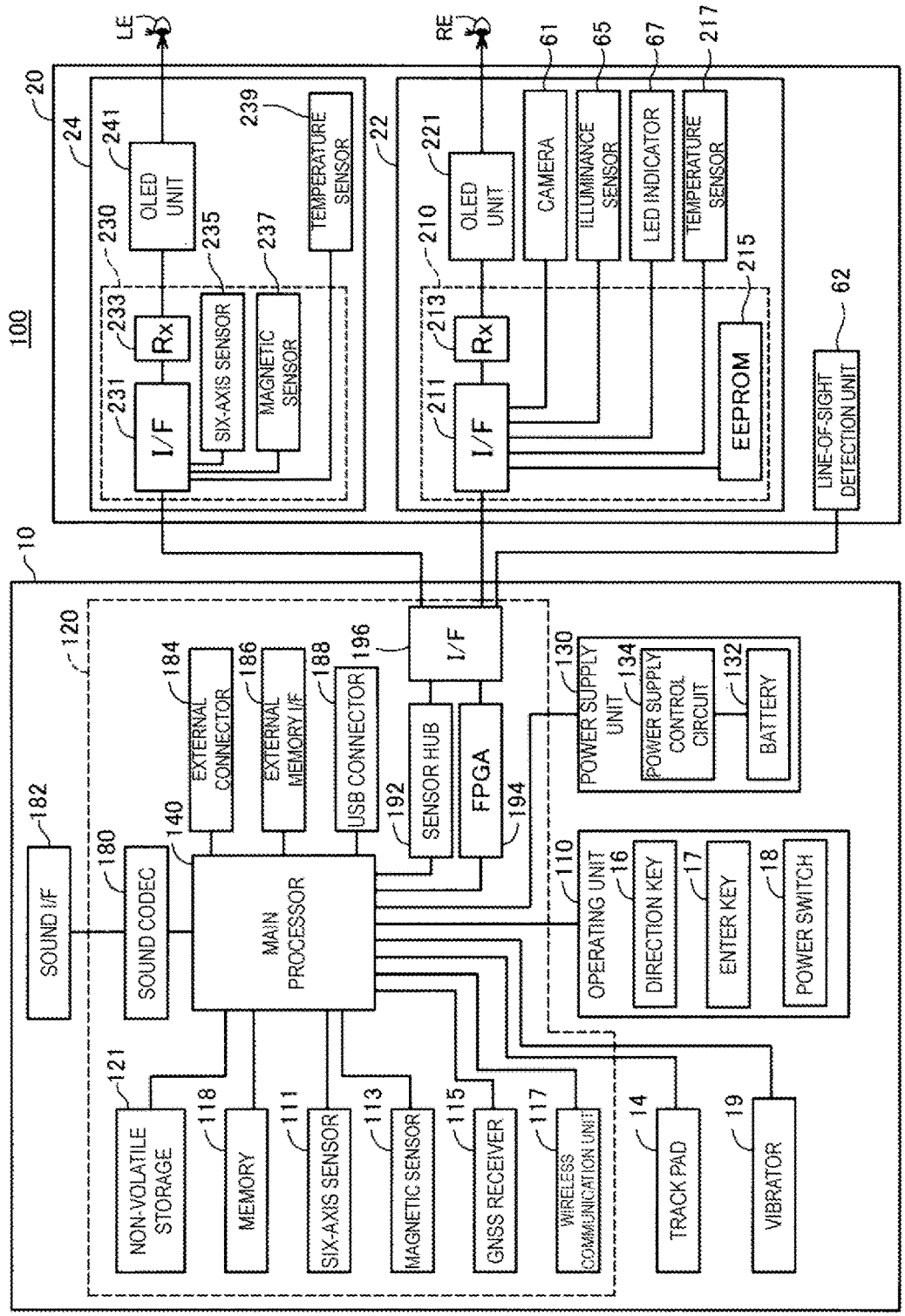
FIG. 6 is a functional block diagram illustrating a configuration of an HMD.

As illustrated in FIG. 1, for example, the microphone 63 is arranged such that a sound collector of the microphone 63 faces in a sight direction of the user. The microphone 63 is configured to collect voice and output voice signals to a voice interface 182 (FIG. 6). The microphone 63 may be a monaural microphone or a stereo microphone, or may be a directional microphone or a non-directional microphone.

The control device 10 is used to control the HMD 100. The control device 10 includes an illumination part 12, a track pad 14, a direction key 16, an enter key 17, and a power switch 18. The illumination part 12 is configured to inform the user of an operation state of the HMD 100 (e.g., power ON/OFF) with its light-emitting mode. The illumination part 12 may be, for example, light-emitting diodes (LEDs).

The track pad 14 is configured to detect a touch operation on an operation face of the track pad 14 to output a signal corresponding to what is detected. Any of various track pads, such as an electrostatic-type track pad, a pressure detection-type track pad, and an optical track pad may be adopted as the track pad 14. The direction key 16 is configured to detect a push operation onto any of keys corresponding to up, down, right and left directions to output a signal corresponding to what is detected. The enter key 17 is configured to detect a push operation to output a signal used to determine the operation performed on the control device 10. The power switch 18 is configured to detect a switch sliding operation to switch the state of the power supply for the HMD 100.

Figure 4:
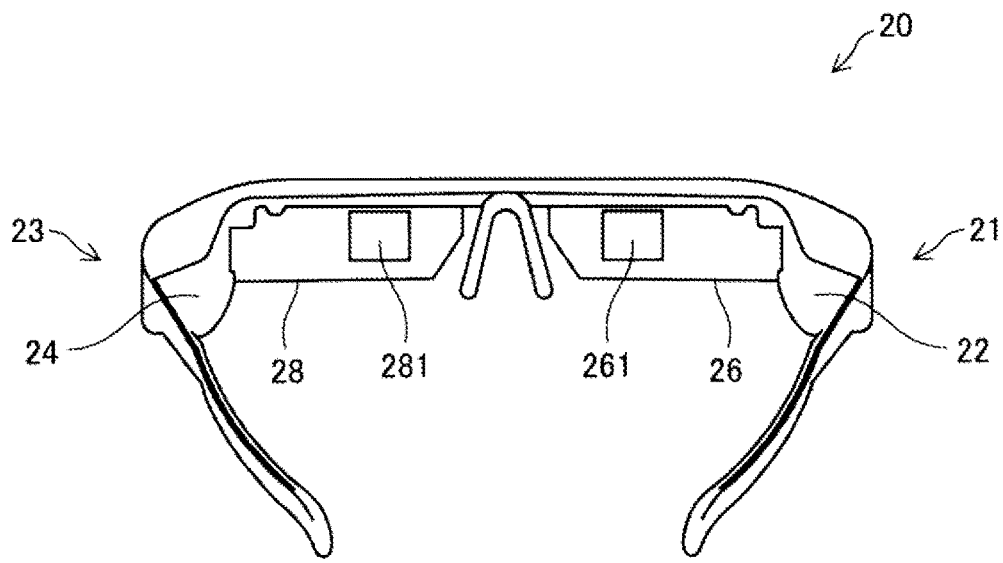
FIG. 4 is a diagram illustrating a configuration of a main part of the display unit as viewed from a user.

FIG. 4 is a diagram illustrating a configuration of a main part of the display unit 20 as viewed from the user. In FIG. 4, illustrations of the connection cable 40, the right earphone 32, and the left earphone 34 are omitted. In the state illustrated in FIG. 4, back sides of the right light-guiding plate 26 and the left light-guiding plate 28 are visible. The half mirror 261 configured to radiate imaging light to the right eye RE, and the half mirror 281 configured to radiate imaging light to the left eye LE are also visible as approximately square-shaped regions. The user views an external scene through the entire areas of the right light-guiding plate 26 and the left light-guiding plate 28 including the half mirrors 261 and 281, and also views rectangular displayed images at the positions of the half mirrors 261 and 281.

Figure 5:
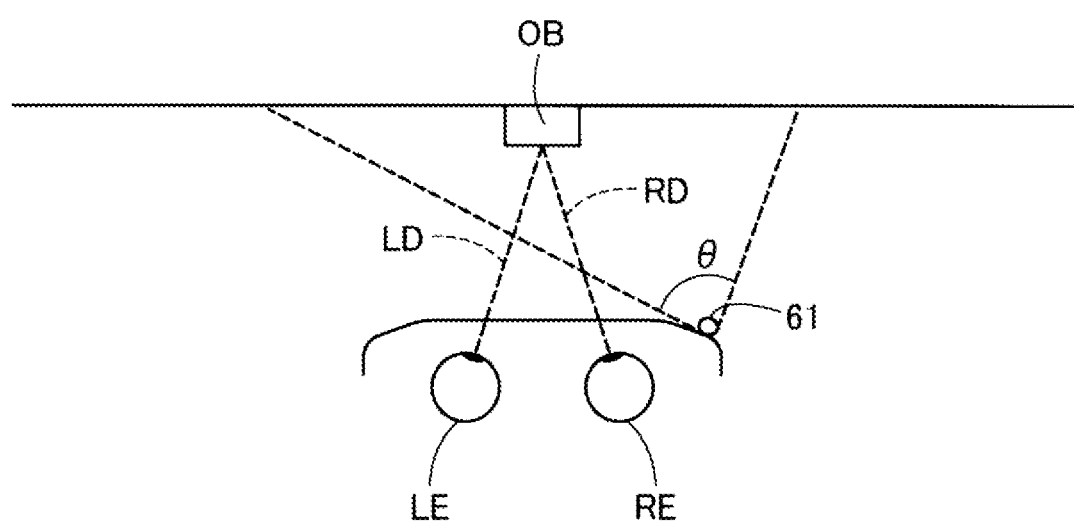
FIG. 5 is a diagram illustrating an angle of view of a camera.

FIG. 5 is a diagram for illustrating the angle of view of the camera 61. FIG. 5 schematically illustrates the camera 61, along with the right eye RE and left eye LE of the user, in a plan view. The angle of view (imaging range) of the camera 61 is represented by θ. The angle of view θ of the camera 61 extends not only in a horizontal direction as illustrated in the figure, but also in a perpendicular direction as is the case with any common digital camera.

As described above, the camera 61 is arranged at an end of the right-hand side of the display unit 20 to capture an image in a direction of the field of view of the user (i.e., in front of the user). For this purpose, the optical axis of the camera 61 extends in a direction including the sight directions of the right eye RE and the left eye LE. The external scene that is visible when the user wears the HMD 100 is not necessarily an infinitely distant scene. For example, when the user fixates on an object OB with both eyes, the line-of-sight of the user is directed to the object OB as illustrated by reference signs RD and LD in the figure. In this case, the distance from the user to the object OB often ranges from approximately 30 cm to 10 m, both inclusive, and more often ranges from 1 m to 4 m, both inclusive. Thus, standard maximum and minimum distances from the user to the object OB that the user can take during normal use of HMD 100 may be specified. These standards may be predetermined and preset in the HMD 100 or they may be set by the user. The optical axis and the angle of view of the camera 61 are preferably set such that the object OB is included within the angle of view when the distance to the object OB during normal use corresponds to the set standards of the maximum and minimum distances.

In general, the viewing angle of a human is known to be approximately 200 degrees in the horizontal direction and approximately 125 degrees in the vertical direction. Within these angles, an effective visual field advantageous for information acceptance performance is approximately 30 degrees in the horizontal direction and approximately 20 degrees in the vertical direction. In general, a stable field of fixation in which a human can promptly and stably view any point of fixation ranges from approximately 60 degrees to 90 degrees, both inclusive, in the horizontal direction and from approximately 45 degrees to 70 degrees, both inclusive, in the vertical direction. In this case, in a case where the point of fixation lies at the object OB (FIG. 5), the effective visual field is approximately 30 degrees in the horizontal direction and approximately 20 degrees in the vertical direction around the line-of-sights RD and LD. Furthermore, the stable visual field of fixation ranges from approximately 60 degrees to 90 degrees, both inclusive, in the horizontal direction and from approximately 45 degrees to 70 degrees, both inclusive, in the vertical direction. The visual field of the user actually viewing an object through the display unit 20, the right light-guiding plate 26, and the left light-guiding plate 28 is referred to as an actual field of view (FOV). The actual field of view is narrower than the visual field angle and the stable field of fixation, but is wider than the effective visual field.

The angle of view θ of the camera 61 according to the exemplary embodiment is set to capture a range wider than the visual field of the user. The angle of view θ of the camera 61 is preferably set to capture a range wider than at least the effective visual field of the user and is more preferably set to capture a range wider than the actual field of view. The angle of view θ of the camera 61 is even more preferably set to capture a range wider than the stable field of fixation of the user and is most preferably set to capture a range wider than the visual field angle of the eyes of the user. The camera 61 may thus include a wide angle lens as an imaging lens, and may be configured to capture an image with a wider angle of view. The wide angle lens may include a super-wide angle lens or a semi-wide angle lens. The camera 61 may also include a fixed focal lens, a zoom lens, or a lens group including a plurality of lenses.

FIG. 6 is a functional block diagram illustrating a configuration of the HMD 100. The control device 10 includes a main processor 140 configured to execute a program to control the HMD 100, storages, input and output units, sensors, interfaces, and a power supply unit 130. The main processor 140 connects to the storage, the input/output units, the sensors, the interfaces, and the power supply unit 130. The main processor 140 is mounted on a controller substrate 120 built into the control device 10.

The storages include a memory 118 and a nonvolatile storage unit 121. The memory 118 constitutes a work area in which computer programs and data to be processed by the main processor 140 are temporarily stored. The non-volatile storage unit 121 includes a flash memory and an embedded multi-media card (eMMC). The nonvolatile storage unit 121 is configured to store computer programs to be executed by the main processor 140 and various data to be processed by the main processor 140. In the exemplary embodiment, these storages are mounted on the controller substrate 120.

The input and output units include the track pad 14 and an operation unit 110. The operation unit 110 includes the direction key 16, the enter key 17, and the power switch 18, included in the control device 10. The main processor 140 is configured to control the input and output units and acquire signals output from the input and output units.

The sensors include a six-axis sensor 111, a magnetic sensor 113, and a global navigation satellite system (GNSS) receiver 115. The six-axis sensor 111 is a motion sensor (inertia sensor) including a three-axis acceleration sensor and a three-axis gyro (angular velocity) sensor. An inertial measurement unit (IMU) in which these sensors are provided as modules may be adopted as the six-axis sensor 111. The magnetic sensor 113 is a three-axis geomagnetic sensor, for example. The GNSS receiver 115 is configured to determine a present position (longitude and latitude) of the control device 10, based on navigation signals received from an artificial satellite constituting the GNSS. The sensors (six-axis sensor 111, magnetic sensor 113, and GNSS receiver 115) output detected values to the main processor 140 in accordance with a predetermined sampling frequency. The sensors may output detected values at timings instructed by the main processor 140.

The interfaces include a wireless communication unit 117, a voice codec 180, an external connector 184, an external memory interface 186, a universal serial bus (USB) connector 188, a sensor hub 192, a field programmable gate array (FPGA) 194, and an interface 196. The components are configured to function as an interface with external devices.

The wireless communication unit 117 is configured to perform wireless communication between the HMD 100 and an external device. The wireless communication unit 117 is configured to include an antenna (not illustrated), a radio frequency (RF) circuit, a baseband circuit, a communication control circuit, and the like, or is configured as a device into which these components are integrated. The wireless communication unit 117 is configured to perform wireless communication in compliance with standards such as Bluetooth (trade name) and wireless LAN including Wi-Fi (trade name).

The voice codec 180 is connected to the voice interface 182 and is configured to encode and decode voice signals input and output via the voice interface 182. The voice interface 182 is an interface configured to input and output the voice signals. The voice codec 180 may include an A/D converter configured to convert an analog voice signal into digital voice data and a digital/analog (D/A) converter configured to convert digital voice data into an analog voice signal. The HMD 100 according to the exemplary embodiment outputs voice from the right earphone 32 and the left earphone 34 and collects voice from the microphone 63. The voice codec 180 is configured to convert digital voice data output by the main processor 140 into an analog voice signal, and output the analog voice signal via the voice interface 182. The voice codec 180 is also configured to convert an analog voice signal input to the voice interface 182 into digital voice data, and output the digital voice data to the main processor 140.

The external connector 184 is a connector configured to connect the main processor 140 to an external device (e.g., personal computer, smartphone, or gaming device) configured to communicate with the main processor 140. The external device connected to the external connector 184 may serve as a source of content, may debug a computer program to be executed by the main processor 140, and may collect an operation log of the HMD 100. The external connector 184 may take various forms. The external connector 184 may be a wired-connection interface such as a USB interface, a micro USB interface, and memory card interface, or a wireless-connection interface such as a wireless LAN interface and a Bluetooth interface.

The external memory interface 186 is an interface configured to connect a portable memory device. The external memory interfaces 186 include, for example, a memory card slot configured to accept a card recording medium for reading and writing data, and an interface circuit. For example, the size and shape of the card recording medium, as well as standards to be used for the card recording medium, may be appropriately selected. The USB connector 188 is an interface configured to connect a memory device, a smartphone, a personal computer, or the like in compliance with the USB standard. The USB connector 188 includes, for example, a connector and an interface circuit in compliance with the USB standard. For example, the size and shape of the USB connector 188, as well as the version of USB standard to be used for the USB connector 188, may be appropriately selected.

The HMD 100 further includes a vibrator 19. The vibrator 19 includes a motor (not illustrated), an eccentric rotor, and the like, and is configured to generate vibration under the control of the main processor 140. The HMD 100 causes the vibrator 19 to generate vibration in a predetermined vibration pattern, for example, in a case where an operation on the operation unit 110 is detected, or in a case where a power supply of the HMD 100 is turned on or off. The vibrator 19 may be provided, instead of being provided in the control device 10, in the display unit 20, for example, in the right holding part 21 (right temple side) of the display unit 20.

The sensor hub 192 and the FPGA 194 are connected to the display unit 20 via the interface (I/F) 196. The sensor hub 192 is configured to acquire detected values of various sensors included in the display unit 20, and output the detected values to the main processor 140. The FPGA 194 is configured to process data to be transmitted and received between the main processor 140 and components of the display unit 20, and perform transmissions via the interface 196. The interface 196 is connected to the right display unit 22 and the left display unit 24 of the display unit 20. In the example of the exemplary embodiment, the connection cable 40 is connected to the left holding portion 23. Wiring, in the display unit 20, connected to the connection cable 40 causes the right display unit 22 and the left display unit 24 to be connected to the interface 196 of the control device 10.

Figure 7:
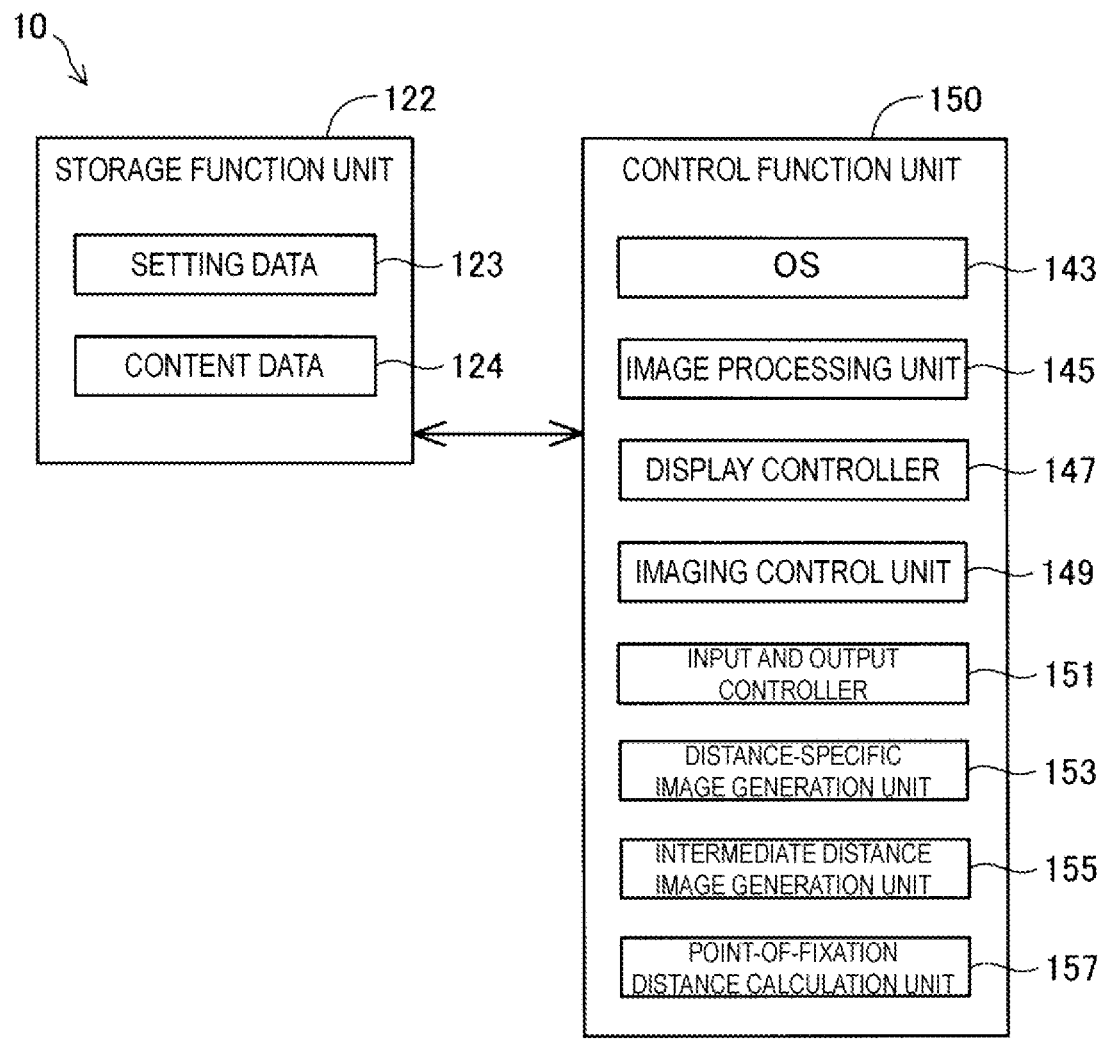
FIG. 7 is a functional block diagram illustrating a configuration of a control device.

The power supply unit 130 includes a battery 132 and a power supply control circuit 134. The power supply unit 130 is configured to supply power used to operate the control device 10. The battery 132 is a rechargeable battery. The power supply control circuit 134 is configured to detect a remaining capacity of the battery 132 and control charging of an operating system (OS) 143 (FIG. 7). The power supply control circuit 134 is connected to the main processor 140, and is configured to output the detected value of the remaining capacity of the battery 132 and the detected value of a voltage of the battery 132 to the main processor 140. Power may be supplied from the control device 10 to the display unit 20, based on the power supplied by the power supply unit 130. The main processor 140 may be configured to control the state of power supply from the power supply unit 130 to components of the control device 10 and the display unit 20.

The right display unit 22 includes a display unit substrate 210, an OLED unit 221, a camera 61, an illuminance sensor 65, an LED indicator 67, and a temperature sensor 217. The display unit substrate 210 is equipped with an interface (I/F) 211 connected to the interface 196, a receiving unit (Rx) 213, and an electrically erasable programmable read-only memory (EEPROM) 215. The receiving unit 213 is configured to receive data from the control device 10 via the interface 211. In a case of receiving image data of an image to be displayed on the OLED unit 221, the receiving unit 213 outputs the received image data to the OLED drive circuit 225 (FIG. 2).

The EEPROM 215 is configured to store various data in such a manner that the main processor 140 can read the data. The EEPROM 215 is configured to store, for example, data about light emission properties and display properties of the OLED units 221 and 241 of the display unit 20, and data about sensor properties of the right display unit 22 or the left display unit 24. Specifically, for example, the EEPROM 215 is configured to store parameters regarding Gamma correction performed by the OLED units 221 and 241, and data used to compensate for the detected values of the temperature sensors 217 and 239 described below. These kinds of data are generated by inspection at the time of shipping of the HMD 100 from a factory, and are written into the EEPROM 215. After shipment, the data is loaded from the EEPROM 215 into the main processor 140, and is used for various processes.

The camera 61 is configured to capture an image in accordance with a signal input via the interface 211, and output imaging data or a signal indicating the result of imaging to the control device 10. As illustrated in FIG. 1, the illuminance sensor 65 is provided at the end ER of the front frame 27 and is disposed to receive outside light coming from in front of the user wearing the display unit 20. The illuminance sensor 65 is configured to output a detected value corresponding to the amount of received light (intensity of received light). As illustrated in FIG. 1, the LED indicator 67 is disposed near the camera 61 at the end ER of the front frame 27. The LED indicator 67 is configured to be turned on during image capturing by the camera 61 to notify that the image capturing is in progress.

The temperature sensor 217 is configured to detect a temperature to output a voltage value or a resistance value corresponding to the detected temperature. The temperature sensor 217 is mounted on the rear face of the OLED panel 223 (FIG. 2). The temperature sensor 217 may be mounted, for example, on the same substrate as the substrate on which the OLED drive circuit 225 is mounted. This configuration allows the temperature sensor 217 to mainly detect the temperature of the OLED panel 223. The temperature sensor 217 may be built into the OLED panel 223 or the OLED drive circuit 225 (FIG. 2). For example, in a case where the OLED panel 223, together with the OLED drive circuit 225, is mounted as an Si-OLED on an integrated semiconductor chip to form an integrated circuit, the temperature sensor 217 may be mounted on the semiconductor chip.

The left display unit 24 includes a display unit substrate 230, an OLED unit 241, and a temperature sensor 239. The display unit substrate 230 is equipped with an interface (I/F) 231 connected to the interface 196, a receiving unit (Rx) 233, a six-axis sensor 235, and a magnetic sensor 237. The receiving unit 233 is configured to receive data input from the control device 10 via the interface 231. In a case where the receiving unit 233 receives image data of an image to be displayed on the OLED unit 241, the receiving unit 233 outputs the received image data to the OLED drive circuit 245 (FIG. 2).

The six-axis sensor 235 is a motion sensor (inertial sensor) including a three-axis acceleration sensor and a three-axis gyro (angular velocity) sensor. The six-axis sensor 235 may be an IMU in which the above-described sensors are provided as modules. The magnetic sensor 237 is a three-axis geomagnetic sensor, for example. The six-axis sensor 235 and the magnetic sensor 237 are provided in the display unit 20, and thus detecting a motion of the head of the user when the display unit 20 is mounted on the user's head. The orientation of the display unit 20, i.e., the field of view of the user, is determined based on the detected motion of the head.

The temperature sensor 239 is configured to detect the temperature to output a voltage value or a resistance value corresponding to the detected temperature. The temperature sensor 239 is mounted on the rear face of the OLED panel 243 (FIG. 2). The temperature sensor 239 may be mounted, for example, on the same substrate as the substrate on which the OLED drive circuit 245 is mounted. This configuration allows the temperature sensor 239 to mainly detect the temperature of the OLED panel 243. The temperature sensor 239 may be built into the OLED panel 243 or the OLED drive circuit 245 (FIG. 2). Details of the temperature sensor 239 is similar to the temperature sensor 217.

The sensor hub 192 of the control device 10 connects to the camera 61, the illuminance sensor 65, and the temperature sensor 217 of the right display unit 22, and to the six-axis sensor 235, the magnetic sensor 237, and the temperature sensor 239 of the left display unit 24. The sensor hub 192 is configured to set and initialize a sampling period of each sensor under the control of the main processor 140. Based on the sampling periods of the sensors, the sensor hub 192 supplies power to the sensors, transmits control data, and acquires detected values, for example. The sensor hub 192 is configured to output, at a preset timing, detected values of the sensors included in the right display unit 22 and the left display unit 24, to the main processor 140. The sensor hub 192 may be configured to include a cache function to temporarily retain the detected values of the sensors. The sensor hub 192 may be configured to include a function to convert a signal format or a data format of detected values of the sensors (e.g., function for conversion into a standard format). The sensor hub 192 is configured to start and stop supplying power to the LED indicator 67 under the control of the main processor 140 to turn on or off the LED indicator 67.

Line-of-sight detection units 62 are respectively disposed at positions corresponding to portions below corners of user's right and left eyes. The right and left line-of-sight detection units 62 include an infrared ray light emitting unit and an infrared ray light receiving unit (not illustrated), respectively. The right line-of-sight detection unit 62 receives an infrared ray emitted from the infrared ray light emitting unit and reflected after reaching the user's right eye. The left line-of-sight detection unit 62 receives an infrared ray emitted from the infrared ray light emitting unit and reflected after reaching the user's left eye. The right and left line-of-sight detection units 62 detect line-of-sights of the user's right and left eyes, respectively, based on the strength of the received infrared ray. The line-of-sight detection units 62 output the detected line of sight to the control device 10, via the interface 196. A reflectivity of the infrared ray differs depending on a case where the infrared ray reaches an iris (black of the eye), a case where the infrared ray reaches an eyelid, and a case where the infrared ray reaches a white of the eye. Thus, the line-of-sight detection units 62 can acquire the motion of the line of sight of the user depending on the strength of the received infrared ray. Note that the line-of-sight detection units 62 may not be provided in the both right and left, and may be provided in either right or left.

FIG. 7 is a functional block diagram illustrating a configuration of the control device 10. In terms of functions, the control device 10 includes a storage function unit 122 and a control function unit 150. The storage function unit 122 is a logical storage configured upon the nonvolatile storage 121 (FIG. 6). Instead of a configuration in which only the storage function unit 122 is used, the storage function unit 122 may be configured to use the EEPROM 215 or the memory 118 in combination with the nonvolatile storage unit 121. The control function unit 150 is configured upon the main processor 140 that executes a computer program, i.e., upon hardware and software that operate together.

The storage function unit 122 is configured to store various data to be processed by the control function unit 150.

Specifically, the storage function unit 122 according to the exemplary embodiment stores setting data 123 and content data 124. The setting data 123 includes various set values regarding operation of the HMD 100. For example, the setting data 123 includes parameters, determinants, computing equations, look-up tables (LUTs), and the like used when the control function unit 150 controls the HMD 100.

The content data 124 includes data of contents including images and movies to be displayed on the display unit 20 as the image display unit is controlled by the control function unit 150 (image data, movie data, sound data, and the like). The content data 124 may include data of bidirectional content. The bidirectional content means a type of content that is displayed by the display unit 20 in accordance with an operation of the user. The operation unit 110 acquires the operation of the user, the control function unit 150 performs a process corresponding to the acquired operation, and the display unit 20 displays content corresponding to the process. In this case, the data representing the content may include data such as image data of a menu screen used to acquire an operation of the user, and data for specifying a process corresponding to an item included in the menu screen.

The control function unit 150 is configured to utilize the data stored in the storage function unit 122 to execute various processes, thereby performing functions as the operating system (OS) 143, an image processing unit 145, a display controller 147, an imaging controller 149, an input and output controller 151, a distance-specific image generation unit 153, an intermediate distance image generation unit 155, and a point-of-fixation distance calculation unit 157. In the exemplary embodiment, the function units other than the OS 143 are configured as computer programs to be executed on the OS 143.

The image processing unit 145 is configured to generate, based on image data or video data to be displayed on the display unit 20, signals to be transmitted to the right display unit 22 and the left display unit 24. The signals generated by the image processing unit 145 may be a vertical synchronization signal, a horizontal synchronization signal, a clock signal, an analog image signal, and the like. The image processing unit 145 may be implemented by the main processor 140 that executes a corresponding computer program, or may be configured by using hardware different from the main processor 140 (e.g., digital signal processor (DSP)).

The image processing unit 145 may be configured to execute a resolution conversion process, an image adjustment process, a 2D/3D conversion process, and the like as needed. The resolution conversion process is a process for converting the resolution of image data into a resolution appropriate for the right display unit 22 and the left display unit 24. The image adjustment process is a process for adjusting the brightness and saturation of image data. The 2D/3D conversion process is a process for generating two-dimensional image data from three-dimensional image data, or generating three-dimensional image data from two-dimensional image data. In a case where any of the processes is executed, the image processing unit 145 is configured to generate a signal for displaying an image based on the processed image data and transmits the signal to the display unit 20 via the connection cable 40.

The display controller 147 is configured to generate enable signals for controlling the right display unit 22 and the left display unit 24, and use the enable signals to control the generation and emission of the image light by each of the right display unit 22 and the left display unit 24. Specifically, the display controller 147 is configured to control the OLED drive circuits 225 and 245 to cause the OLED panels 223 and 243 to display images. The display controller 147 is configured to control, for example, a timing when the OLED drive circuits 225 and 245 draw images on the OLED panels 223 and 243, and brightness of the OLED panels 223 and 243, based on the signal output by the image processing unit 145. Further, in a display control process described later, the display controller 147 displays a below-described distance-specific display image generated by the distance-specific image generation unit 153, on each virtual screen of the display unit 20.

The imaging controller 149 is configured to control the camera 61 to capture an image and generate captured imaging data, and to cause the storage function unit 122 to temporarily store the captured imaging data. In a case where the camera 61 is configured as a camera unit including a circuit for generating imaging data, the imaging controller 149 is configured to acquire the imaging data from the camera 61 and causes the storage function unit 122 to temporarily store the imaging data.

The input and output controller 151 is configured to appropriately control the track pad 14 (FIG. 1), the direction key 16, and the enter key 17 to receive input commands. The received entered instructions are output to the OS 143 or to a computer program to be executed on the OS 143 together with the OS 143.

The distance-specific image generation unit 153 generates a display image for displaying, on the above-described virtual screen, a display object present between the two adjacent focal lengths, out of the above-described respective three-level focal lengths (hereinafter, referred to as "distance-specific display image"). Note that the distance-specific display image will be described below in detail.

The intermediate distance image generation unit 155 generates a display image (hereinafter, referred to as "intermediate distance display image") for displaying, on the above-described virtual screen, a display object representing an object to be displayed present at an intermediate position of the above-described respective three-level focal lengths. At this time, the intermediate distance image generation unit 155 combines colors of the display objects present in each of the first focal length, the second focal length, and the third focal length, and sets the resultant color as the color of the intermediate distance display image. Note that at this time, the intermediate distance image generation unit 155 may combine luminances (brightness) of the display objects present in each of the first focal length, the second focal length, and the third focal length, and set the resultant luminance (brightness), as the color of the intermediate distance display image.

The point-of-fixation distance calculation unit 157 calculates a point-of-fixation distance. In the exemplary embodiment, the "point-of-fixation distance" means a distance between a user and the point of fixation upon which the user focuses. Further, the "the point of fixation" means a point at which right and left virtual lines connecting a user's center excavation (location with the highest power of vision in a retina) and the center of an iris intersect. The point-of-fixation distance calculation unit 157 detects the point of fixation of the user from a user's line of sight detected by the line-of-sight detection units 62 and calculates, as the point-of-fixation distance, a distance between the detected point of fixation and user's eye. Note that the point-of-fixation distance calculation unit 157 may repeatedly calculate the point-of-fixation distance. This enables acquisition of the point-of-fixation distance in real time.

A2. Augmented Reality Display

Figure 8:
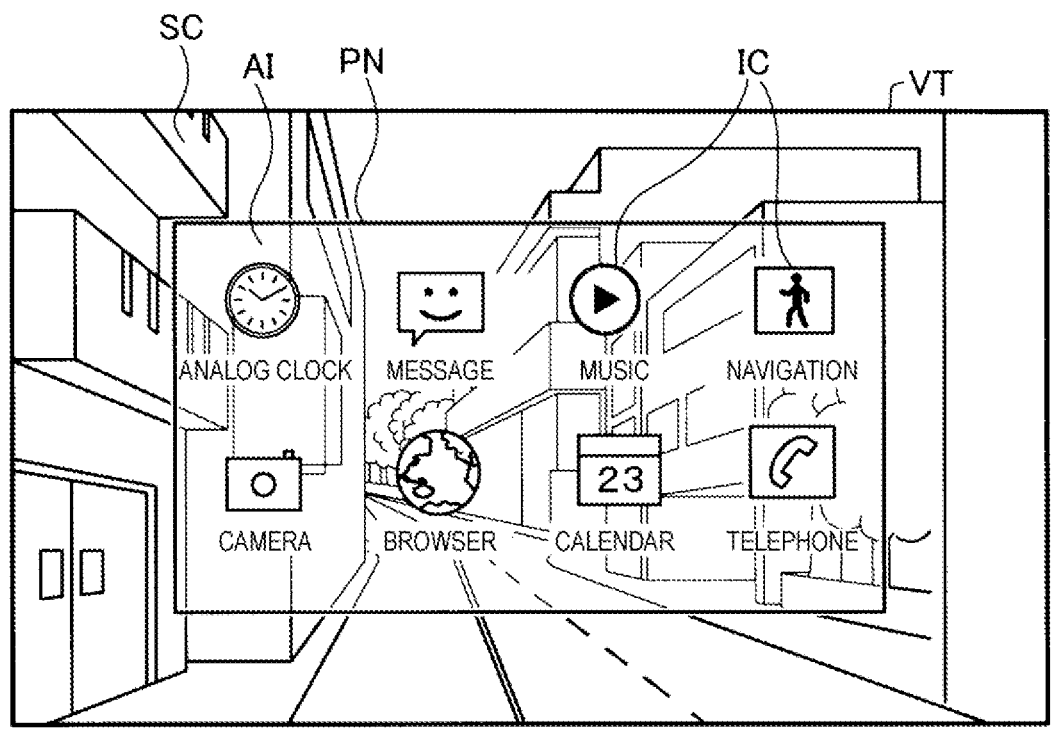
FIG. 8 is an explanatory diagram illustrating an example of an augmented reality display provided by the HMD.

FIG. 8 is an explanatory diagram illustrating an example of an augmented reality display provided by the HMD 100. FIG. 8 illustrates the field of view VT of the user. As described above, image light guided to the eyes of the user of the HMD 100 is formed into an image on the retinas of the user, allowing the user to view, in the display area PN, an object image AI of a display object as augmented reality (AR). In the example illustrated in FIG. 8, the object image AI is a menu screen of the OS of the HMD 100. The menu screen includes icon images IC for activating application programs such as "Analog clock", "Message", "Music", "Navigation", "Camera", "Browser", "Calendar", and "Telephone". Furthermore, an external light passes through the right light-guiding plate 26 and the left light-guiding plate 28, allowing the user to view an external scene SC. Thus, the user of the HMD 100 according to the exemplary embodiment can view, in a portion displaying the object image AI in the field of view VT, the object image AI in such a manner that the object image AI overlaps the external scenery SC. Furthermore, the user of the HMD 100 according to the exemplary embodiment can view, in a portion not displaying the object image AI in the field of view VT, only the external scenery SC.

Figure 9:
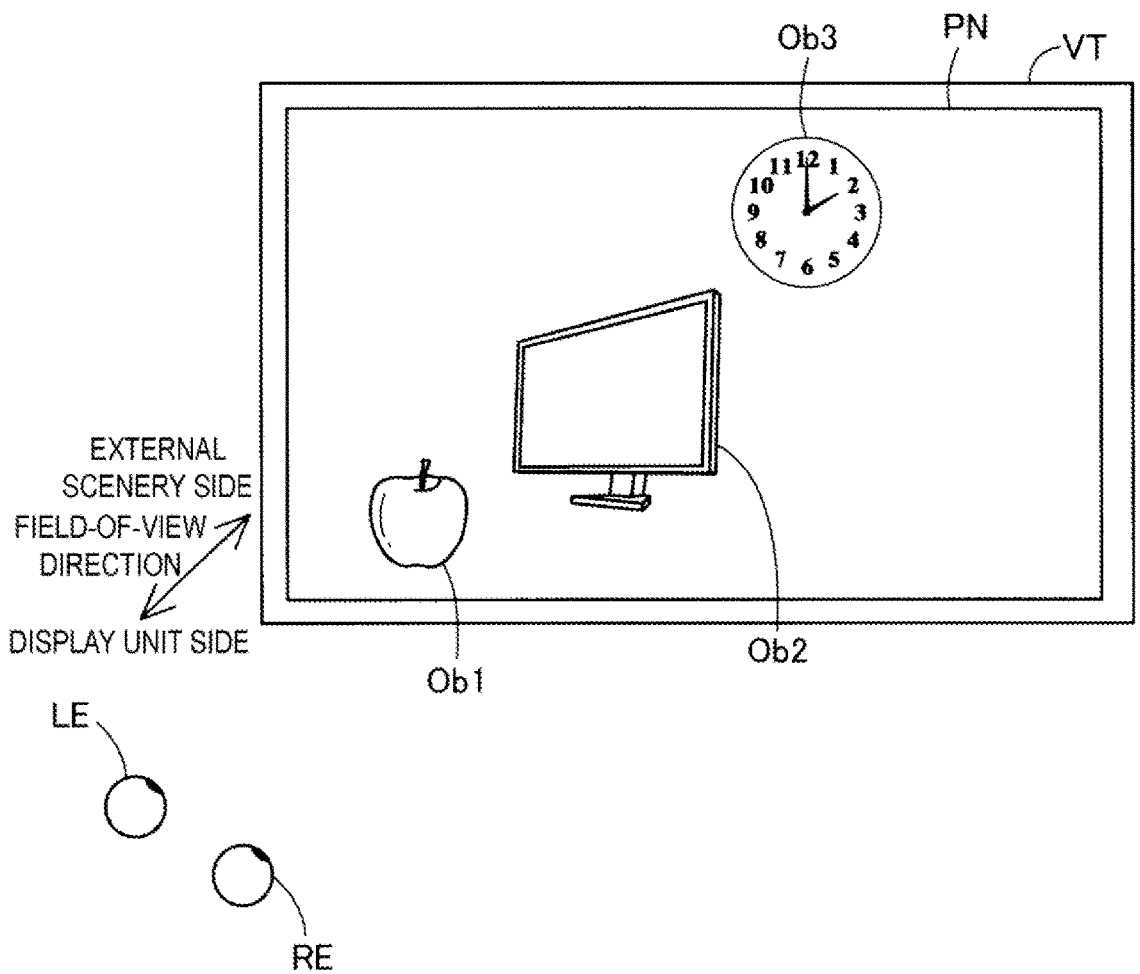
FIG. 9 is an explanatory diagram schematically illustrating an example of a display object.

FIG. 9 is an explanatory diagram schematically illustrating an example of a display object. The field of view VT is viewed by a user through the display unit 20 of the HMD 100 worn by the user of the HMD 100. Note that the external scene SC is omitted in FIG. 9. In a display region PN, three display objects Ob1, Ob2, and Ob3 are displayed. In the exemplary embodiment, the term "display object" manes a stereoscopic (3D) display image representing an object to be displayed. Specifically, the first display object Ob1 is a stereoscopic display image representing an "apple" being an object to be displayed. The second display object Ob2 is a stereoscopic display image representing a "television" being an object to be displayed. The third display object Ob3 is a stereoscopic display image representing a "clock" being an object to be displayed.

As illustrated in FIG. 9, the three display objects Ob1, Ob2, and Ob3 are displayed to be disposed in order of the first display object Ob1, the second display object Ob2, and the third display object Ob3 from a display unit 20 side (from a side closer to the user) in the direction of the user's field of view of the HMD 100. At this time, a distance from the left eye LE and the right eye RE of the user of the HMD 100 to each of the display objects Ob1, Ob2, and Ob3 differs depending on each of the display objects Ob1, Ob2, and Ob3.

Figure 10:
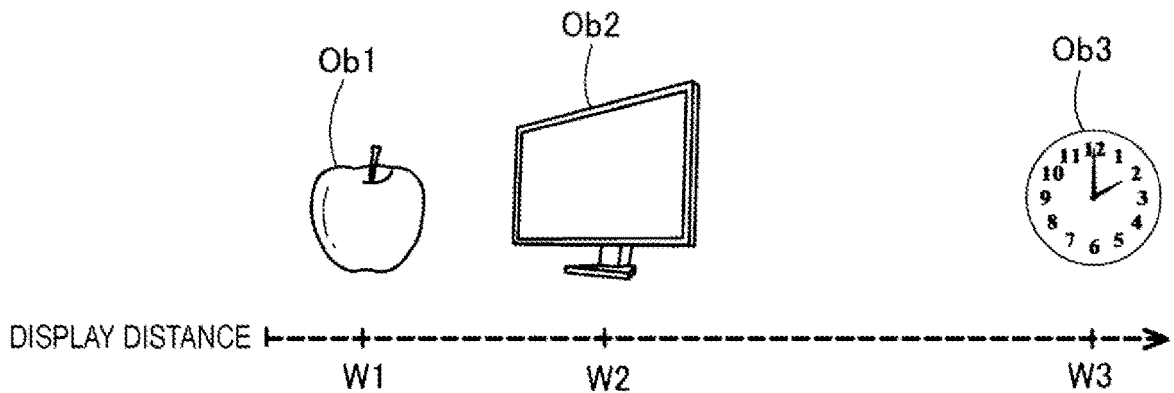
FIG. 10 is an explanatory diagram schematically illustrating a display distance of the display object.

FIG. 10 is an explanatory diagram schematically illustrating display distances of the display objects Ob1, Ob2, and Ob3. In the exemplary embodiment, the term "display distance" means a distance between viewpoint positions of the right eye RE and the left eye LE of the user and the display position of the display object. As illustrated in FIG. 10, the display distance of the first display object Ob1 is a first display distance W1. The first display distance W1 is the same as the first focal length set to the focal length changing lens SL2 of the short-distance optical system SL in the display unit 20, or 50 cm. The display distance of the second display object Ob2 is a second display distance W2. The second display distance W2 is the same as the second focal length set to the focal length changing lens ML2 of the mid-distance optical system ML in the display unit 20, or 1 m. The display distance of the third display object Ob3 is a third display distance W3. The third display distance W3 is the same as the third focal length set to the focal length changing lens LL2 of the long-distance optical system LL in the display unit 20, or 2 m.

As illustrated in FIG. 9 and FIG. 10, when the display objects Ob1, Ob2, and Ob3 with different display distances are displayed on a display screen corresponding to a single focal length, an optical mismatch occurs which results from a difference in focal length of each of the display objects Ob1, Ob2, and Ob3 and a difference in angle of convergence of each of the display objects Ob1, Ob2, and Ob3. However, in the exemplary embodiment, in a below-described display control process, when the display objects Ob1, Ob2, and Ob3 are cut out for each focal length to generate the display images and the display image generated on the virtual screen corresponding to a focal length far, out of the two focal lengths next to each other, in the direction of the field of view of the user of the HMD 100, is displayed, the above-described optical mismatch can be reduced. How the processes are executed will be specifically described below.

A3. Display Control Process

Figure 11:
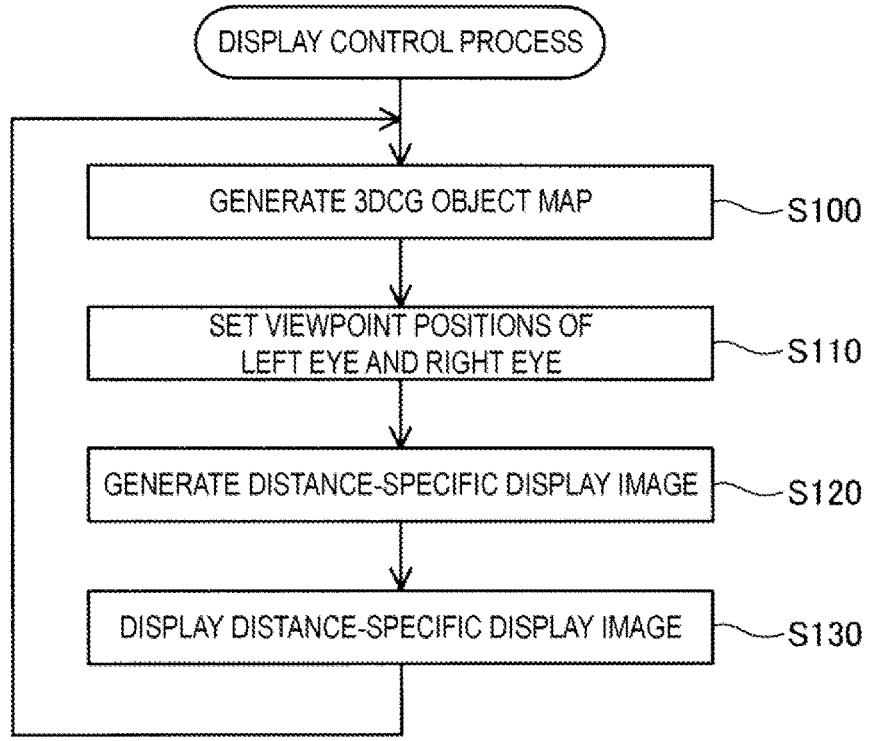
FIG. 11 is a flowchart illustrating how a display control process proceeds.

FIG. 11 is a flowchart illustrating how a display control process proceeds. The display control process is started when a user turns on a power switch 18 of the control device 10. The distance-specific image generation unit 153 generates a 3DCG object map (step S100). The 3DCG object map is obtained by mapping a three-dimensional computer graphics object and a position (coordinates) of the object. The 3DCG object map can be created by a known method, and for example, can be created by disposing, based on the positions of the display objects Ob1, Ob2, and Ob3 corresponding to objects in the external scenery SC that can be viewed after being transmitted through the display unit 20 (objects present in a real space), the display objects Ob1, Ob2, and Ob3 in a virtual environment of the three-dimensional computer graphics.

Figure 12:
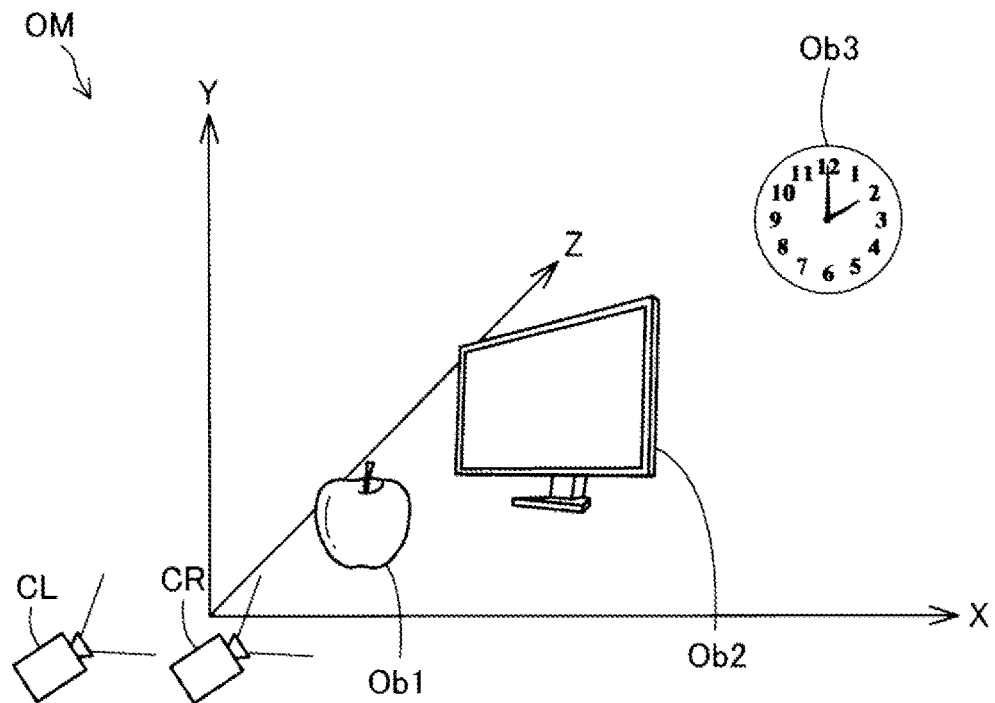
FIG. 12 is an explanatory diagram schematically illustrating a 3DCG object map.

FIG. 12 is an explanatory diagram schematically illustrating a 3DCG object map OM. As illustrated in FIG. 12, the display objects Ob1, Ob2, and Ob3 are disposed in an XYZ space in the 3DCG object map OM. The display objects Ob1, Ob2, and Ob3 are disposed in a positional relationship similar to a positional relationship illustrated in FIG. 9 and FIG. 10. When the distance-specific image generation unit 153 specifies the display positions of the display objects Ob1, Ob2, and Ob3, based on a reference position of an object present in the real space obtained when the object is viewed from a user's viewpoint position, the display objects Ob1, Ob2, and Ob3 can be disposed at a position at which the object present in the real space and the object to be displayed are matched in position, in the 3DCG object map OM. Note that as illustrated in FIG. 12, a left-eye virtual camera CL and a right-eye virtual camera CR are set to the 3DCG object map OM. Each of the virtual cameras CL and CR is used when a below-described distance-specific display image is created.

As illustrated in FIG. 11, the distance-specific image generation unit 153 sets viewpoint positions of the left eye LE and the right eye RE (step S110). Specifically, the distance-specific image generation unit 153 sets the position of the left-eye virtual camera CL set to the 3DCG object map OM, to the viewpoint position of the left eye LE of a user of the HMD 100, and sets the position of the right-eye virtual camera CR to the viewpoint position of the right eye RE of a user of the HMD 100, respectively. At this time, the distance-specific image generation unit 153 sets an orientation of each of the virtual cameras CL and CR, to a direction of the field of view of the user of the HMD 100. Note that step S110 may be executed at the same time as step S100.

As illustrated in FIG. 11, the distance-specific image generation unit 153 generates the distance-specific display image (step S120). Specifically, the distance-specific image generation unit 153 captures the display objects Ob1, Ob2, and Ob3 by the virtual cameras CL and CR, and cuts out the display objects Ob1, Ob2, and Ob3 present between the two focal lengths next to each other from the captured image. More specifically, the distance-specific image generation unit 153 cuts out the display object present from the focal length of 0 cm to the first focal length, in the 3DCG object map OM to generate the distance-specific display image corresponding to the first focal length (hereinafter referred to as "first distance-specific display image"). In the exemplary embodiment, the term "focal length being 0 cm" means that the distance from the position of the user's viewpoint is 0 cm. Thus, the position of each of the virtual cameras CL and CR is set to the position of the viewpoints of the left eye LE and the right eye RE of a user of the HMD 100, and therefore, the distance-specific image generation unit 153 will cut out the display object present between each of the virtual cameras CL and CR and the first focal length.

Furthermore, the distance-specific image generation unit 153 cuts out the display object present from the first focal length to the second focal length, in the 3DCG object map OM to generate the distance-specific display image corresponding to the second focal length (hereinafter referred to as "second distance-specific display image"). Moreover, the distance-specific image generation unit 153 cuts out the display object present from the second focal length to the third focal length, in the 3DCG object map OM to generate the distance-specific display image corresponding to the third focal length (hereinafter referred to as "third distance-specific display image").

For example, in an example illustrated in FIG. 12, as the first distance-specific display image, an image obtained by cutting out the first display object Ob1 is generated. Furthermore, as the second distance-specific display image, an image obtained by cutting out the second display object Ob2, and as the third distance-specific display image, an image obtained by cutting out the third display object Ob3 are generated, respectively. Note that in addition to the display object present between the second focal length and the third focal length, a display object present farther than the third focal length in the direction of the user's field of view may be cut out for the third distance-specific display image.

Note that in the above-described step S120, when the display objects Ob1, Ob2, and Ob3 completely overlap as viewed in the direction of the field of view of the user, the distance-specific image generation unit 153 cuts out only the display object located near in the direction of the field of view, and does not cut out the display object located far in the direction of the field of view. Further, when the display objects Ob1, Ob2, and Ob3 partially overlap as viewed in the direction of the field of view of the user, the distance-specific image generation unit 153 cuts out the display object located near in the direction of the field of view, and cuts out a portion not overlapping with the display object located near in the direction of the field of view, out of the display objects located far in the direction of the field of view. At this time, the distance-specific image generation unit 153 cuts a portion overlapping the display object located near in the direction of the field of view from the display object located far in the direction of the field of view to cut out a portion except for the overlapping portion. This is to alleviate a discomfort given to a user by cutting out only a portion viewed by the virtual cameras CL and CR and not cutting out a portion not viewed by the virtual cameras CL and CR.

As illustrated in FIG. 11, the display controller 147 displays the generated distance-specific display image on the virtual screen (step S130). Specifically, the display controller 147 simultaneously displays each of the distance-specific display images on the virtual screen corresponding to a focal length far in the direction of the field of view of the user, out of the two focal lengths next to each other. For example, the focal length corresponding to the first distance-specific display image is 0 cm and the first focal length, and the focal length far in the direction of the field of view of the user is the first focal length. Therefore, the first distance-specific display image is displayed on the first virtual screen corresponding to the first focal length. Furthermore, for example, the focal length corresponding to the second distance-specific display image is the first focal length and the second focal length, and the focal length far in the direction of the field of view of the user is the second focal length. Therefore, the second distance-specific display image is displayed on the second virtual screen corresponding to the second focal length. Furthermore, for example, the focal length corresponding to the third distance-specific display image is the second focal length and the third focal length, and the focal length far in the direction of the field of view of the user is the third focal length. Therefore, the third distance-specific display image is displayed on the third virtual screen corresponding to the third focal length.

Figure 13:
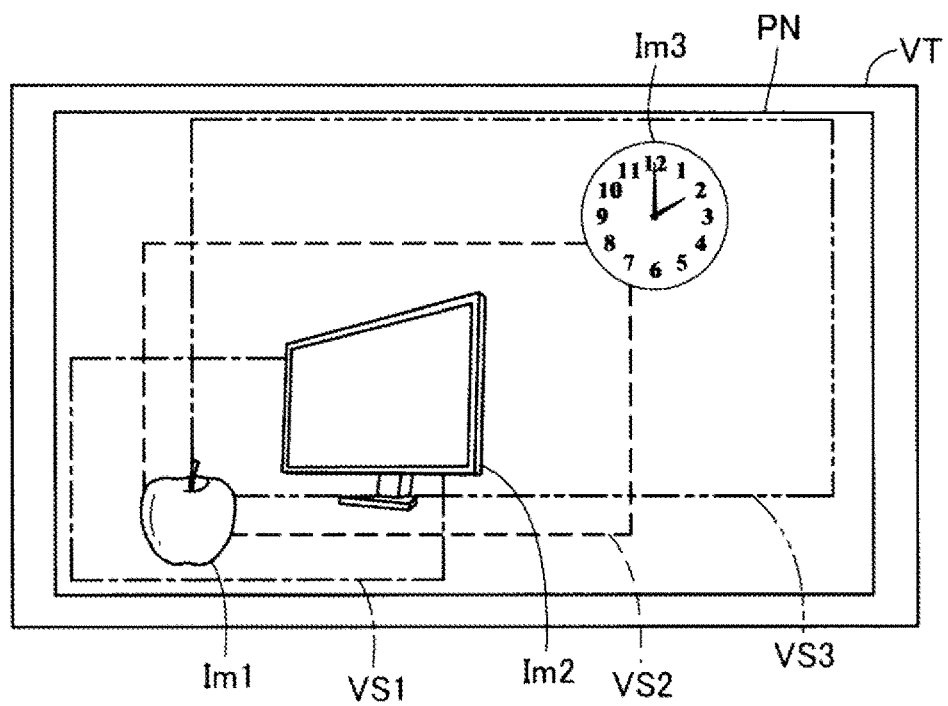
FIG. 13 is an explanatory diagram schematically illustrating a user's field of view after execution of step S130.

FIG. 13 is an explanatory diagram schematically illustrating the field of view VT of the user after execution of step S130. In FIG. 13, the external scene SC is omitted as with FIG. 9. As illustrated in FIG. 13, in the display region PN, distance-specific display images Im1, Im2, and Im3 are displayed. The first distance-specific display image Im1 is displayed on a first virtual screen VS1 illustrated by a one-dot chain. The second distance-specific display image Im2 is displayed on a second virtual screen VS2 illustrated by a broken line. The third distance-specific display image Im3 is displayed on a third virtual screen VS3 illustrated by a two-dot chain line. As described above, the distance-specific display images Im1, Im2, and Im3 are displayed on the virtual screens VS1, VS2, and VS3 corresponding to focal lengths different from each other, and thus, when the user fixates on the distance-specific display images Im1, Im2, and Im3, the user can view the distance-specific display images Im1, Im2, and Im3 while reducing a deviation in focal length and a deviation in angle of convergence.

Figure 14:
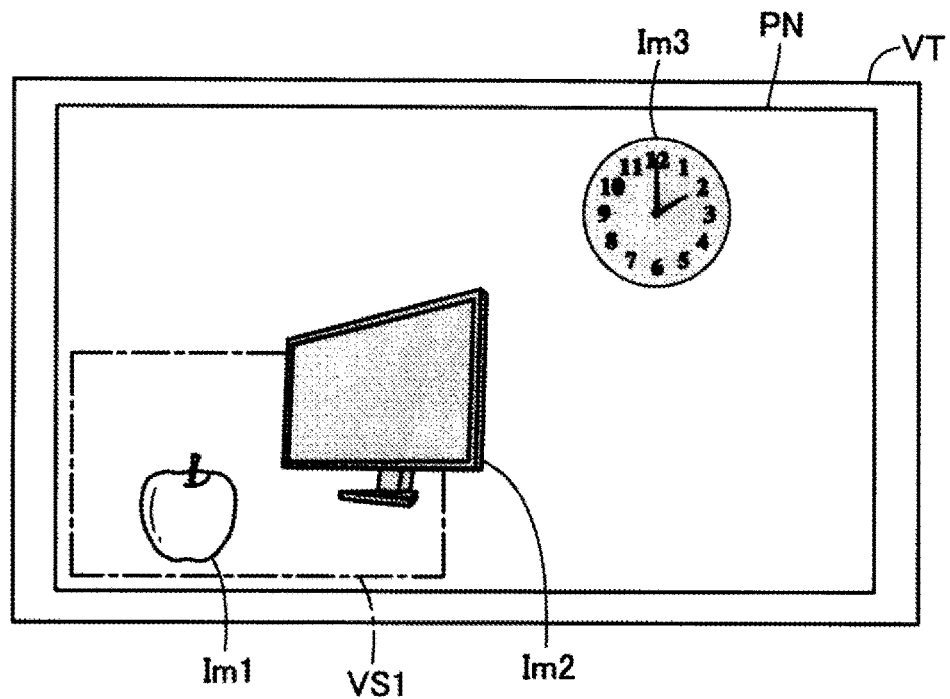

FIG. 14 is an explanatory diagram schematically illustrating the field of view VT of the user if the first distance-specific display image Im1 is fixated on. In FIG. 14, the external scene SC is omitted as with FIG. 13. As illustrated in FIG. 14, when the user fixates on the first distance-specific display image Im1, the display distance (first display distance W1) of the first display object Ob1 and the first focal length are the same, and thus, the first distance-specific display image Im1 is focused on the first virtual screen VS1. In this case, the second distance-specific display image Im2 is displayed on the second virtual screen VS2 corresponding to the second focal length greater than the first display distance W1, and the third distance-specific display image Im3 is displayed on the third virtual screen VS3 corresponding to the third focal length greater than the first display distance W1, respectively, and thus, the second distance-specific display image Im2 and the third distance-specific display image Im3 are viewed dimly. Note that in FIG. 14, the second distance-specific display image Im2 and the third distance-specific display image Im3 are hatched to schematically illustrate a dimly viewed state.

Figure 15:
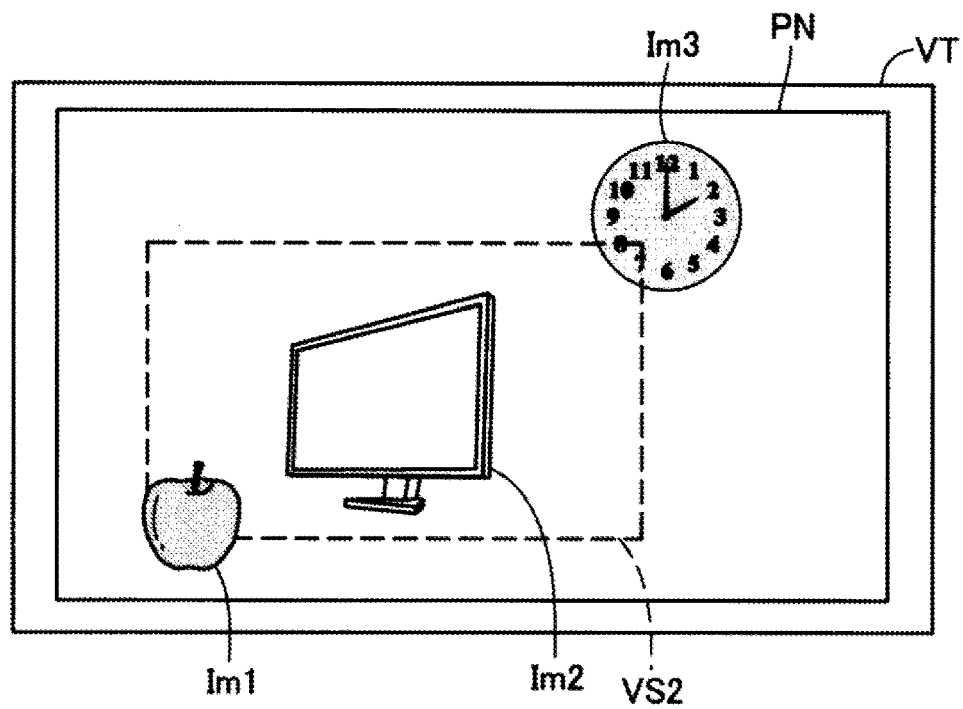

FIG. 15 is an explanatory diagram schematically illustrating the field of view VT of the user if the second distance-specific display image Im2 is fixated on. In FIG. 15, the external scene SC is omitted as with FIG. 14. Similarly to FIG. 14, in FIG. 15, the first distance-specific display image Im1 and the third distance-specific display image Im3 are hatched to schematically illustrate a dimly viewed state due to a deviation in focal length. As illustrated in FIG. 15, when the user fixates on the second distance-specific display image Im2, the display distance (second display distance W2) of the second display object Ob2 and the second focal length are the same, and thus, the second distance-specific display image Im2 is focused on the second virtual screen VS2. In this case, the first distance-specific display image Im1 is displayed on the first virtual screen VS1 corresponding to the first focal length less than the second display distance W2, and the third distance-specific display image Im3 is displayed on the third virtual screen VS3 corresponding to the third focal length greater than the second display distance W2, respectively, and thus, the first distance-specific display image Im1 and the third distance-specific display image Im3 are viewed dimly.

Figure 16:
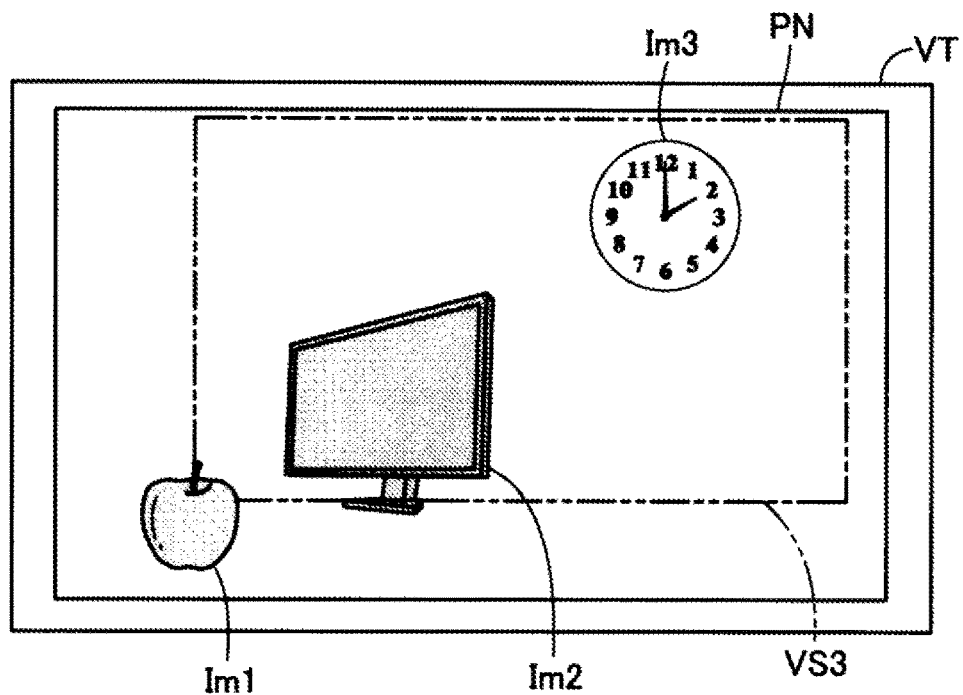

FIG. 16 is an explanatory diagram schematically illustrating the field of view VT of the user if the third distance-specific display image Im3 is fixated on. In FIG. 16, the external scene SC is omitted as with FIG. 14. Similarly to FIG. 14, in FIG. 16, the first distance-specific display image Im1 and the second distance-specific display image Im2 are hatched to schematically illustrate a dimly viewed state due to a deviation in focal length. As illustrated in FIG. 16, when the user fixates on the third distance-specific display image Im3, the display distance (third display distance W3) of the third display object Ob3 and the third focal length are the same, and thus, the third distance-specific display image Im3 is focused on the third virtual screen VS3. In this case, the first distance-specific display image Im1 is displayed on the first virtual screen VS1 corresponding to the first focal length less than the third display distance W3, and the second distance-specific display image Im2 is displayed on the second virtual screen VS2 corresponding to the second focal length less than the third display distance W3, respectively, and thus, the first distance-specific display image Im1 and the second distance-specific display image Im2 are viewed dimly.

As illustrated in FIG. 11, after the execution of step S130, the process returns to the above-described step S100.

Based on the HMD 100 according to the above-described exemplary embodiment, the distance-specific display images Im1, Im2, and Im3 for displaying the display objects Ob1, Ob2, and Ob3 representing the objects to be displayed present between the two focal lengths next to each other, on the virtual screens VS1, VS2, and VS3, are generated. Furthermore, the generated distance-specific display images Im1, Im2, and Im3 are displayed on the virtual screen corresponding to the focal length far in the direction of the field of view of the user of the HMD 100, out of the two focal lengths next to each other, and thus, an optical mismatch resulting from a deviation in angle of convergence and a deviation in a focal length can be reduced.

Besides, when a plurality of display objects Ob1, Ob2, and Ob3 overlap as viewed in the direction of the field of view, some of the display objects Ob1, Ob2, and Ob3 located far in the direction of the field of view, out of the plurality of display objects Ob1, Ob2, and Ob3, are not displayed, and thus a discomfort given to the user can be reduced as compared to a configuration where the display objects Ob1, Ob2, and Ob3 located in the direction of the field of view are displayed.

B. Second Exemplary Embodiment

A head-mounted display apparatus 100 according to Second Exemplary Embodiment is the same as the head-mounted display apparatus 100 according to first Exemplary Embodiment. Detailed description of the head-mounted display apparatus 100 according to Second Exemplary Embodiment is thus omitted.

A control function unit in Second Exemplary Embodiment differs from the control function unit 150 in First Exemplary Embodiment in that the display controller 147 displays an entire display object representing the object to be displayed present continuously over a plurality of focal lengths (hereinafter, referred to as "continuous display object"), onto the virtual screen corresponding to a focal length closest to the focal length. The remaining configurations of the control function unit according to Second Exemplary Embodiment are the same as the corresponding configurations of the control function unit 150 according to First Exemplary Embodiment. Detailed description of the remaining configurations is thus omitted.

Figure 17:
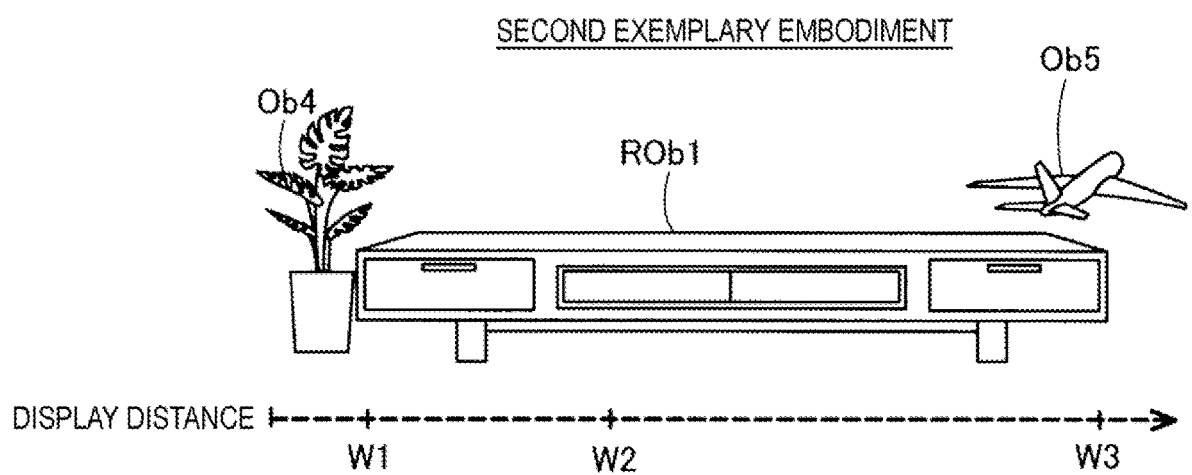
FIG. 17 is an explanatory diagram schematically illustrating a display distance of a display object in Second Exemplary Embodiment.

FIG. 17 is an explanatory diagram schematically illustrating display distances of display objects Ob4, Ob5, and ROb1 in Second Exemplary Embodiment. As illustrated in FIG. 17, the fourth display object Ob4 is a stereoscopic display image representing a "foliage plant" being an object to be displayed. The continuous display object ROb1 is a stereoscopic display image representing a "base" being an object to be displayed. The fifth display object Ob5 is a stereoscopic display image representing an "airplane" being an object to be displayed. The display distance of the fourth display object Ob4 is the first display distance W1. The display distance of the continuous display object ROb1 is a distance from the first display distance W1 to the third display distance W3. The display distance of the fifth display object Ob5 is the third display distance W3. Similarly to First Exemplary Embodiment, the display distances W1, W2, and W3 correspond to the first focal length, the second focal length, and the third focal length, respectively.

Figure 18:
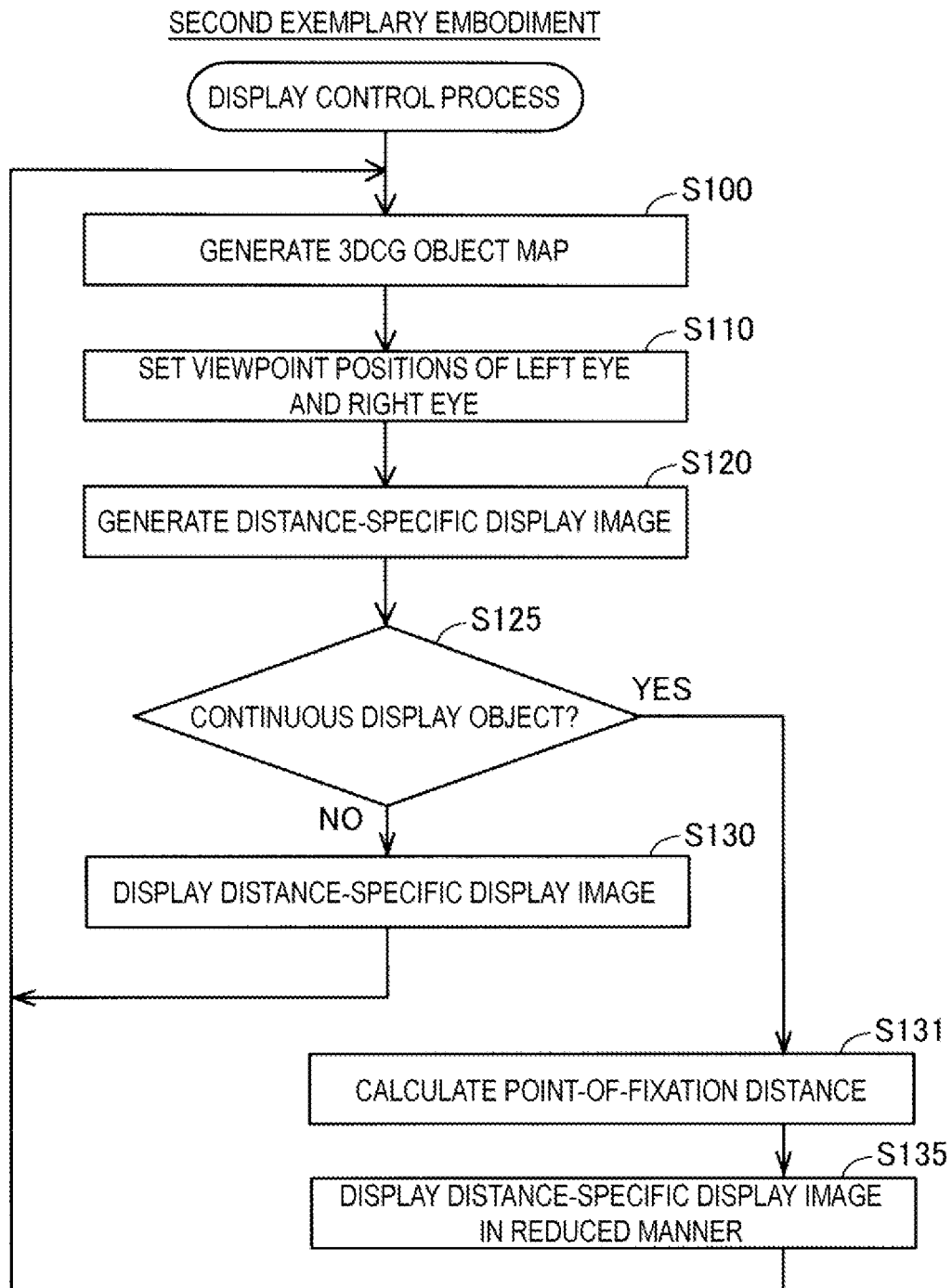
FIG. 18 is a flowchart illustrating how a display control process according to Second Exemplary Embodiment proceeds.

FIG. 18 is a flowchart illustrating how a display control process according to Second Exemplary Embodiment proceeds. A display control process according to Second Exemplary Embodiment is different in processing procedure from the display control process according to First Exemplary Embodiment illustrated in FIG. 11 in that step S125, step S131, and step S135 are additionally executed. The remaining part of the procedure of the display control process according to Second Exemplary Embodiment is the same as the corresponding part of the procedure of the display control process according to First Exemplary Embodiment. The same reference signs are assigned to the same procedures, and detailed description of the remaining part of the procedure is thus omitted.

As illustrated in FIG. 18, when the distance-specific display image is generated (step S120), the distance-specific image generation unit 153 determines whether or not the display object is the continuous display object ROb1 (step S125). Specifically, the distance-specific image generation unit 153 analyzes an image captured by each of the virtual cameras CL and CR to specify whether or not the display object continuous over a plurality of focal lengths. When it is determined that the display object is not the continuous display object ROb1 (step S125: NO), the above-described step S130 is executed. On the other hand, when it is determined that the display object is the continuous display object ROb1 (step S125: YES), the point-of-fixation distance calculation unit 157 calculates the point-of-fixation distance (step S131). Specifically, firstly, the line-of-sight detection units 62 detects a line of sight of the user. Next, the point-of-fixation distance calculation unit 157 calculates the point of fixation from the detected line of sight to calculate the point-of-fixation distance.

The display controller 147 displays the distance-specific display image in a reduced manner (step S135). Specifically, the display controller 147 displays the distance-specific display image of the continuous display object ROb1 (hereinafter, referred to as "continuous distance-specific display image") on the virtual screen corresponding to the focal length closest to the calculated point-of-fixation distance, out of the above-described first focal length, second focal length, and third focal length. In order to display, on a single virtual screen, the continuous display object ROb1 continuing over a plurality of focal lengths, the display controller 147 displays the continuous display-specific display image in a reduced manner to match the size of the virtual screen.

Figure 19:
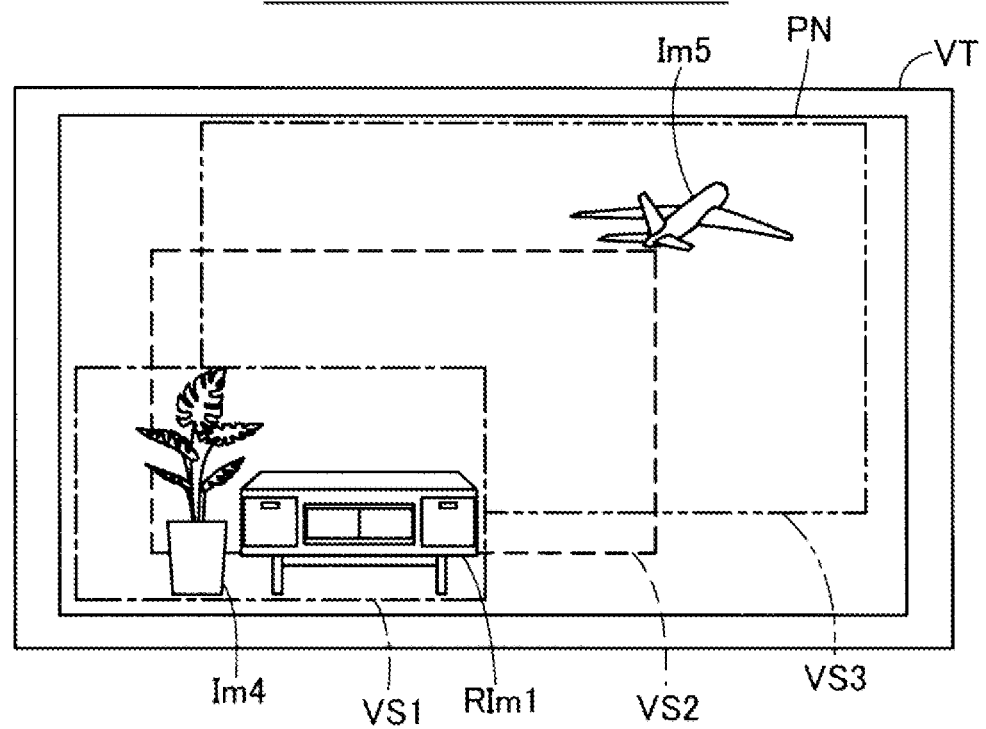
FIG. 19 is an explanatory diagram schematically illustrating a user's field of view after execution of step S135.

FIG. 19 is an explanatory diagram schematically illustrating the field of view VT of the user after execution of step S135. In FIG. 19, the external scene SC is omitted as with FIG. 13. As illustrated in FIG. 19, in the display region PN, distance-specific display images Im4, RIm1, and Im5 are displayed. As illustrated in FIG. 17, the fourth display object Ob4 is not the continuous display object RObl, and thus, the above-described step S130 is executed, and as illustrated in FIG. 19, the fourth distance-specific display image Im4 is displayed on the first virtual screen VS1 corresponding to the first focal length. Likewise, the fifth display object Ob5 is not the continuous display object RObl, and thus, the above-described step S130 is executed, and the fifth distance-specific display image Im5 is displayed on the third virtual screen VS3 corresponding to the third focal length.

On the other hand, as illustrated in FIG. 17, the continuous display object RObl is the display object lying over the first display distance W1 to the third display distance W3, and thus, the above-described step S135 is executed, and the continuous distance-specific display image RIm1 is displayed on the virtual screen (the first virtual screen VS1 in the example illustrated in FIG. 19) corresponding to the focal length closest to the calculated point-of-fixation distance. Furthermore, the continuous distance-specific display image RIm1 is displayed in a reduced manner so that an entire continuous display object RObl is displayed in the first virtual screen VS1.

According to the HMD 100 in the above-described Second Exemplary Embodiment, effects similar to those in First Exemplary Embodiment can be produced. Besides, the entire continuous display object RObl present continuously over the plurality of focal lengths is displayed on the first virtual screen VS1 corresponding to the focal length closest to the point-of-fixation distance, and thus, the continuous display object RObl is accurately displayed.

C: Third Exemplary Embodiment

A head-mounted display apparatus 100 according to Third Exemplary Embodiment is the same as the head-mounted display apparatus 100 according to first Exemplary Embodiment. Detailed description of the head-mounted display apparatus 100 according to Third Exemplary Embodiment is thus omitted.

The control function unit in Third Exemplary Embodiment differs from the control function unit 150 in First Exemplary Embodiment in that the display controller 147 divides the continuous display object RObl, for each focal length, and displays the divided continuous display object RObl to be divided into the virtual screens VS1, VS2, and VS3 corresponding to each focal length. The remaining configurations of the control function unit according to Third Exemplary Embodiment are the same as the corresponding configurations of the control function unit 150 according to First Exemplary Embodiment. Detailed description of the remaining configurations is thus omitted.

Figure 20:
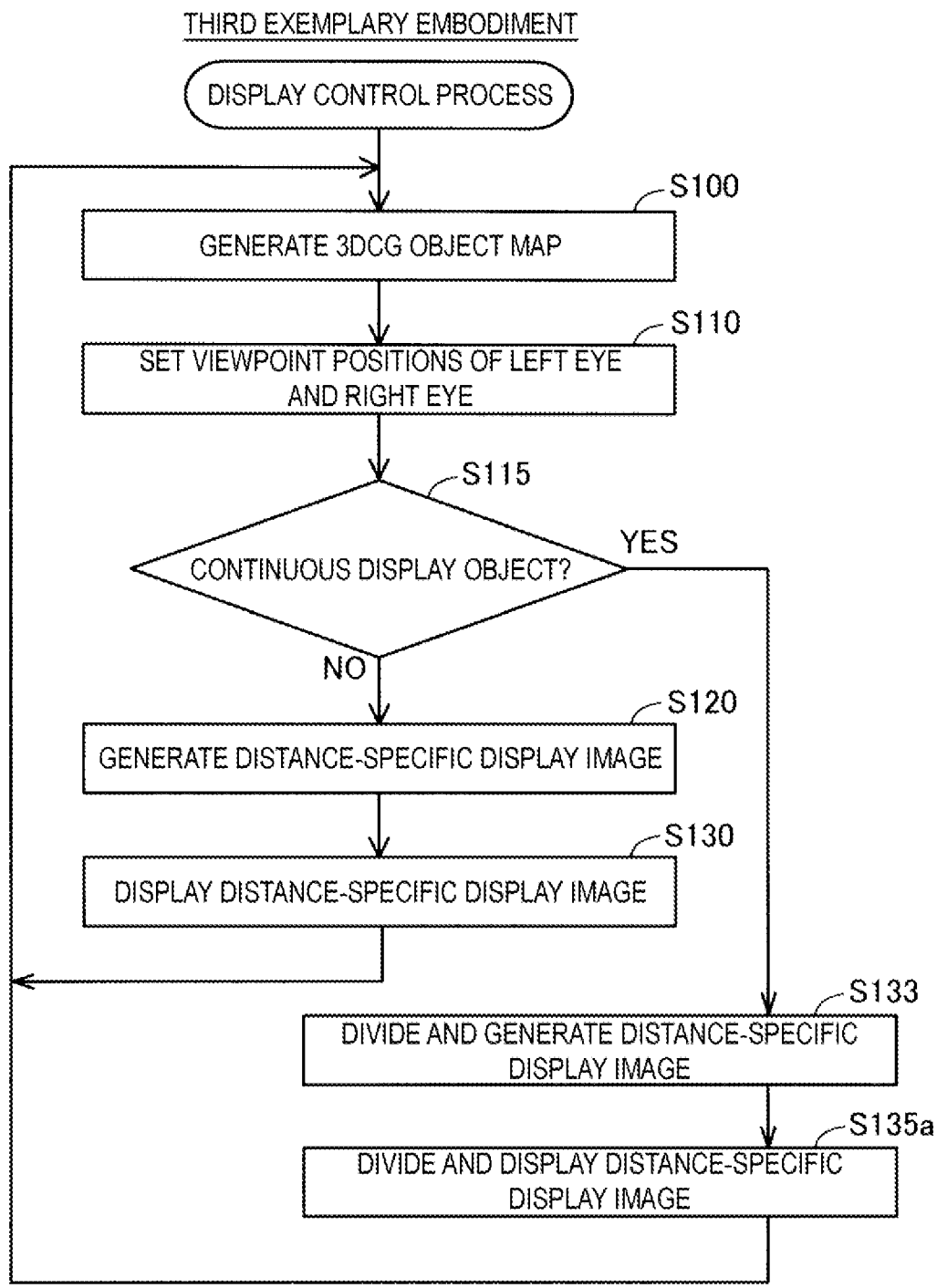
FIG. 20 is a flowchart illustrating how a display control process according to Third Exemplary Embodiment proceeds.

FIG. 20 is a flowchart illustrating how a display control process according to Third Exemplary Embodiment proceeds. The display control process according to Third Exemplary Embodiment is different in processing procedure from the display control process according to Second Exemplary Embodiment illustrated in FIG. 18 in that step S115 and step S133 are additionally executed, step S125 is omitted, and instead of step S135, step S135a is executed. The remaining part of the procedure of the displaying control process according to Third Exemplary Embodiment is the same as the corresponding part of the procedure of the displaying control process according to Second Exemplary Embodiment. The same reference signs are assigned to the same procedures, and detailed description of the remaining part of the procedure is thus omitted. Note that step S115 and step S125 illustrated in FIG. 18 are the same procedure, however, for convenience of the processing procedure, different symbols are allotted.

As illustrated in FIG. 20, when the viewpoint positions of the left eye LE and the right eye RE are set (step S110), the distance-specific image generation unit 153 determines whether or not the display object is the continuous display object RObl (step S115). A process content in step S115 is the same as that in the above-described step S125. When it is determined that the display object is not the continuous display object RObl (step S115: NO), the above-described step S120 is executed. On the other hand, when it is determined that the display object is the continuous display object RObl (step S115: YES), the distance-specific image generation unit 153 generates the distance-specific display image in a divided manner (step S133). Specifically, the distance-specific image generation unit 153 generates an image of a portion from the virtual cameras CL and CR to the first focal length, an image of a portion from the first focal length to the second focal length, and an image of a portion from the second focal length to the third focal length, respectively, out of the continuous distance-specific display image, to generate the continuous distance-specific display image.

The display controller 147 displays the distance-specific display image in a divided manner (step S135a). Specifically, the display controller 147 displays an image of a portion from the virtual cameras CL and CR to the first focal length, out of the continuous distance-specific display image, on the first virtual screen VS1. Furthermore, the display controller 147 displays an image of a portion from the first focal length to the second focal length, out of the continuous distance-specific display image, on the second virtual screen VS2. Moreover, the display controller 147 displays an image of a portion from the second focal length to the third focal length, out of the continuous distance-specific display image, on the third virtual screen VS3.

Figure 21:
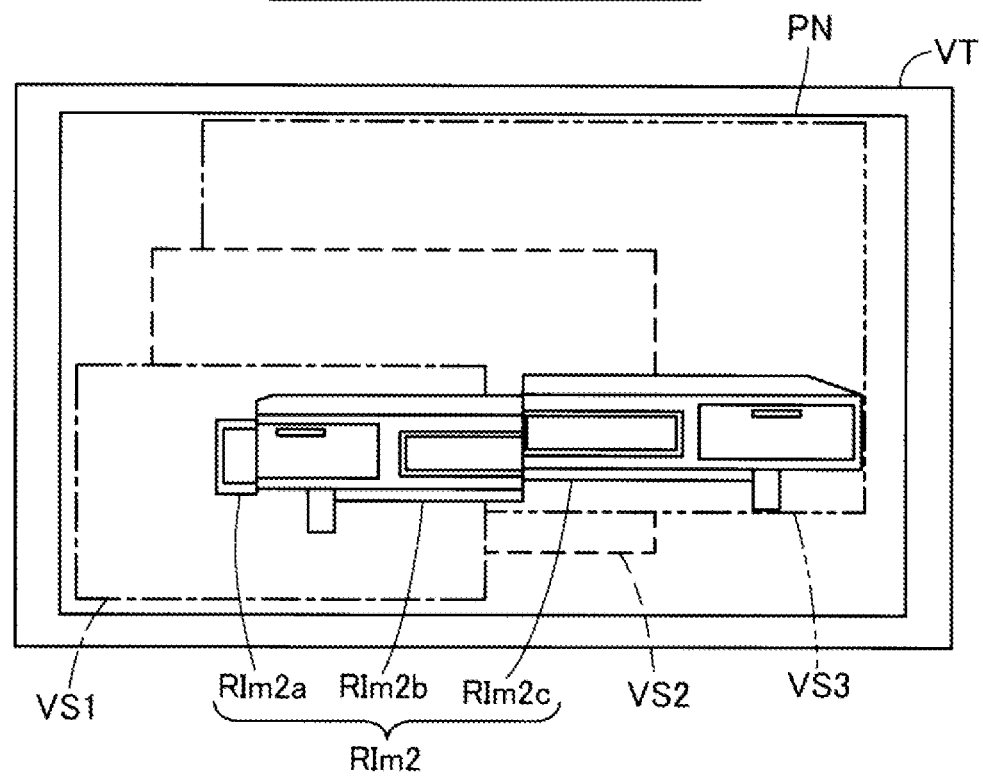

FIG. 21 is an explanatory diagram schematically illustrating the field of view VT of the user after execution of step S135a. In FIG. 21, the external scene SC is omitted as with FIG. 19. Furthermore, in FIG. 21, illustration of the distance-specific display images Im4 and Im5 illustrated in FIG. 19 is omitted. As illustrated in FIG. 21, in the display region PN, a continuous distance-specific display image RIm2 is displayed. The continuous distance-specific display image RIm2 includes three continuous distance-specific display images, that is, RIm2a, RIm2b, and RIm2c. The continuous distance-specific display images RIm2a, RIm2b, and RIm2c are displayed on respectively different virtual screens. Specifically, the continuous distance-specific display image RIm2a is displayed on the first virtual screen VS1, the continuous distance-specific display image RIm2b is displayed on the second virtual screen VS2, and the continuous distance-specific display image RIm2c is displayed on the third virtual screen VS3, respectively.

As seen from the comparison of FIG. 17 and FIG. 21, in Third Exemplary Embodiment, the continuous display object ROb1 is displayed so that the size of the object to be displayed is left unchanged. Furthermore, when the user fixates on the virtual screens VS1, VS2, and VS3, the user can focus on any one of the continuous distance-specific display images RIm2a, RIm2b, and RIm2c displayed on the fixated virtual screens VS1, VS2, and VS3.

According to the HMD 100 of the above-described Third Exemplary Embodiment, effects similar to the effects in First Exemplary Embodiment can be produced. Besides, the continuous display object ROb1 present continuously over the plurality of focal lengths is displayed on the virtual screens VS1, VS2, and VS3 while being divided in each focal length, and thus, when the focus point of the user is focused on any one of the virtual screens VS1, VS2, and VS3, the user can accurately view the continuous display object ROb1.

D. Other Exemplary Embodiments

D1. Other Exemplary Embodiment 1

In First Exemplary Embodiment, the display controller 147 may display the intermediate distance display image on the virtual screen corresponding to the focal length closest to the point-of-fixation distance. For example, when a display object is present between the first display object Ob1 and the second display object Ob2 illustrated in FIG. 10, according to First Exemplary Embodiment, an intermediate distance-specific display image that is a display image of the display object is displayed on the second virtual screen VS2 corresponding to the second focal length far in the sight direction of the user, out of the first focal length and the second focal length corresponding to the intermediate distance-specific display image.

Instead thereof, the display controller 147 may display the intermediate distance-specific display image on the virtual screen corresponding to the focal length closest to the point-of-fixation distance calculated by the point-of-fixation distance calculation unit 157. Furthermore, for example, the display controller 147 may display the intermediate distance-specific display image on the first virtual screen VS1. Moreover, for example, the display controller 147 may display the intermediate distance-specific display image on both the first virtual screen VS1 and the second virtual screen VS2. In such a configuration, the display controller 147 may display the intermediate distance-specific display image with different brightness (luminance) between the point-of-fixation distances. Specifically, the display controller 147 may display so that the brightness (luminance) increases as the focal length is longer. That is, generally, in the configuration that the intermediate distance display image is displayed on at least one of the first virtual screen VS1 and the second virtual screen VS2, the effect similar to the effect in each of the above-described exemplary embodiments can be produced.

D2. Other Exemplary Embodiment 2

In each of the above-described exemplary embodiments, the distance-specific image generation unit 153 may utilize the point-of-fixation distance to generate the distance-specific display image. Specifically, in the above-described step S120, the distance-specific image generation unit 153 cuts out the display object present from the viewpoint position of the user to the point-of-fixation distance to generate the distance-specific display image, and in the above-described step S130, the display controller 147 may display the generated distance-specific display image on the virtual screen corresponding to the focal length closest to the point-of-fixation distance. Such a configuration also produces effects similar to the effects of the exemplary embodiments described above.

D3. Other Exemplary Embodiment 3

In Second Exemplary Embodiment, the display controller 147 displays the entire continuous distance-specific display image RIm1 on the virtual screen corresponding to the focal length closest to the point-of-fixation distance; however, the present invention is not limited thereto. For example, the display controller 147 may calculate a middle point of the length of the continuous display object ROb1 in the sight direction of the user, calculate a distance between the user and the middle point, and may display the entire continuous distance-specific display image RIm1 on the virtual screen corresponding to the focal length closest to the calculated distance. Such a configuration also produces effects similar to the effects of the exemplary embodiments described above.

D4. Other Exemplary Embodiment 4

In each of the above-described exemplary embodiments, the line-of-sight detection units 62 includes the infrared ray light emitting unit and the infrared ray light receiving unit; however, the present invention is not limited thereto. For example, the line-of-sight detection units 62 may be a camera for capturing a pupil. In such a configuration, when the images of the right eye RE and the left eye LE of the user captured by right and left cameras for capturing a pupil are analyzed, the sight direction may be specified. In such a configuration, the point-of-fixation distance calculation unit 157 can estimate the position viewed by the user depending on the specified sight direction, and thus, the point of fixation of the user can be specified. Furthermore, for example, the line-of-sight detection units 62 may utilize a detection result of a muscle sensor, a well-known technology such as an eye tracking and the like to detect the line of sight of the user. Such a configuration also produces effects similar to the effects of the exemplary embodiments described above.

D5. Other Exemplary Embodiment 5

In each of the above-described exemplary embodiments, each focal length is not limited to the above-described example. For example, instead of 50 cm, the first focal length may be set to any distance within a reach of a hand of the user. Furthermore, for example, instead of 1 m, the second focal length may be set to any distance between the first focal length and the third focal length. Moreover, for example, instead of 2 m, the third focal length may be set to any distance that is greater than the first focal length and the second focal length and that is within a range where the focal length of the user is effective. Such a configuration also produces effects similar to the effects of the exemplary embodiments described above.

D6. Other Exemplary Embodiment 6

In each of the above-described exemplary embodiments, the number of virtual screens set for the display unit 20 is three; however, instead thereof, the number of virtual screens may be six in total having three virtual screens for the left eye LE and three virtual screens for the right eye RE, for example, and in a configuration where a virtual screen is set for each of a plurality of focal lengths predetermined in the display unit 20, any number of virtual screens may be set. Such a configuration also produces effects similar to the effects of the exemplary embodiments described above.

D7. Other Exemplary Embodiment 7

In each of the above-described exemplary embodiments, the OLED units 221 and 241 are configured to include the OLED panels 223 and 243 and the OLED drive circuits 225 and 245 configured to drive the OLED panels 223 and 243, and the OLED panels 223 and 243 are each a self-light-emitting display panel including light emitting elements configured to emit light by organic electro-luminescence. However, the present invention is not limited to this. Furthermore, each of the OLED panels 223 and 243 includes a plurality of pixels arranged in a matrix, and each of the plurality of pixels corresponds to a unit including one element of R, one element of G, and one element of B. However, the present invention is not limited to this. For example, the right display unit 22 and the left display unit 24 each may be configured as a video element that includes an OLED panel serving as a light source unit and a modulation element to modulate light emitted by the light source unit to output image light including a plurality of colors of light. Note that the modulation device for modulating the light emitted by the OLED panel is not limited to a configuration in which a transmission-type liquid crystal panel is adopted. For example, a reflective liquid crystal panel may be used instead of the transmission-type liquid crystal panel, or a digital micro-mirror device or a laser scan type laser retinal projection HMD may be used. Such a configuration also produces effects similar to the effects of the exemplary embodiments described above.

D8. Other Exemplary Embodiment 8

In each of the above-described exemplary embodiments, in a case where the display objects overlap in the direction of the field of view, the display controller 147 displays a portion obtained by removing the portion overlapping the display object located near, out of the display objects located far in the direction of the field of view. However, the present invention is not limited to this. For example, the display controller 147 may display an entire display object located far in the direction of the field of view of the user. In such a configuration, the luminance and the saturation of the display object located far in the direction of the field of view is lowered compared to the luminance and the saturation of the display object located near, for example. As a result, the display object may be displayed with the visibility of the display object located far in the direction of the field of view being lowered. That is, generally, in a case where a plurality of display objects overlap in the direction of the field of view, in a configuration where at least a portion of the display object located far in the direction of the field of view, out of the plurality of display objects, is not displayed, the effect similar to the effects in the above-described exemplary embodiments can be produced.

D9. Other Exemplary Embodiment 9

In each of the above-described exemplary embodiments, the head-mounted display apparatus 100 is the transmission-type head-mounted display apparatus; however, the present invention is not limited thereto. For example, the HMD 100 may be a video see-through type HMD or a single-eye-type head-mounted display apparatus. Such a configuration also produces effects similar to the effects of the exemplary embodiments described above.

D10. Other Exemplary Embodiment 10

In each of the above-described exemplary embodiments, the distance-specific display images Im1 to Im5 are displayed on the virtual screens VS1 to VS3; however, instead thereof or in addition thereto, between the first virtual screen VS1 and the second virtual screen VS2, or between the second virtual screen VS2 and the third virtual screen VS3, virtual screens different from the virtual screens VS1 to VS3 are predetermined, respectively, and a distance-specific display image of a display object located between the first virtual screen VS1 and the second virtual screen VS2 may be displayed selectively on either one of the virtual screen set between the first virtual screen VS1 and the second virtual screen VS2 or the second virtual screen VS2, and may be displayed on both of the virtual screens. Such a configuration also produces effects similar to the effects of the exemplary embodiments described above.

D11. Other Exemplary Embodiment 11

In each of the above-described exemplary embodiments, the virtual screens VS1 to VS3 are set to correspond to a predetermined focal length in the direction of the field of view of the user; however, the present invention is not limited thereto. For example, the virtual screens VS1 to VS3 may be set to correspond to a predetermined focal length in the sight direction of the user. In such a configuration, in the above-described display control process, the orientations of the virtual cameras CL and CR are set to the sight direction of the user, and thereby the distance-specific display image of the object to be displayed present in the sight direction of the user may be generated. Furthermore, for example, the virtual screens VS1 to VS3 may be set to correspond to a predetermined focal length in the sight direction of the user. Such a configuration also produces effects similar to the effects of the exemplary embodiments described above.

The invention is not limited to the exemplary embodiments described above, and can be realized in various configurations without departing from the gist of the invention. For example, appropriate replacements or combinations may be made to the technical features in the exemplary embodiments which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

E. Other Modes (1) According to an exemplary embodiment of the invention, a head-mounted display apparatus is provided. The head-mounted display apparatus includes a display unit configured to display each of virtual screens set to each of a plurality of predetermined focal lengths, a distance-specific image generation unit configured to generate distance-specific display images for displaying, on the virtual screens, a display object representing an object to be displayed present between two focal lengths next to each other of the plurality of focal lengths, and a display controller configured to display each of the generated distance-specific display images on the virtual screen corresponding to a focal length far in a direction of a field of view of a user wearing the head-mounted display apparatus, out of the two focal lengths next to each other.

According to the head-mounted display apparatus based on the exemplary embodiment, the distance-specific display images for displaying, on the virtual screen, the display object representing the object to be displayed present between the two focal lengths next to each other are generated, and each of the generated distance-specific display images is displayed on the virtual screen corresponding to the focal length far in the direction of the field of view of the user wearing the head-mounted display apparatus, out of the two focal lengths next to each other, and thus, an optical mismatch resulting from a deviation in angle of convergence and a deviation in a focal length can be reduced.

(2) In the head-mounted display apparatus according to the exemplary embodiment, when a plurality of the display objects overlap as viewed in the direction of the field of view, the display controller may not display at least a portion of the display object located far in the direction of the field of view, out of the plurality of the display objects.

According to the head-mounted display apparatus based on the exemplary embodiment, in a case where the plurality of the display objects overlap as viewed in the direction of the field of view, at least a portion of the display object located far in the direction of the field of view, out of the plurality of the display objects, is not displayed, and thus, a discomfort given to the user can be reduced as compared to a configuration where the display object located far in the direction of the field of view is displayed.

(3) The head-mounted display apparatus according to the exemplary embodiment, further may include: a line-of-sight detection unit configured to detect a line of sight of the user; and a point-of-fixation distance calculation unit configured to calculate, from the detected line of sight, a point-of-fixation distance that is a distance between the user and a point of fixation upon which the user fixates. The display controller may display an entirety of a continuous display object that is the display object representing an object to be displayed present continuously over a plurality of the focal lengths, onto the virtual screen corresponding to the focal length closest to the point-of-fixation distance.

According to the head-mounted display apparatus based on the exemplary embodiment, the entire continuous display object present continuously over the plurality of focal lengths is displayed on the virtual screen corresponding to the focal length closest to the point-of-fixation distance, and thus, the continuous display object can be accurately displayed.

(4) In the head-mounted display apparatus based on the exemplary embodiment, the display controller may divide, for each of the focal lengths, a continuous display object that is the display object representing an object to be displayed present continuously over the plurality of the focal lengths to display the continuous display object on each of the virtual screens.

According to the head-mounted display apparatus based on the exemplary embodiment, the continuous display object present continuously over the plurality of the focal lengths is divided into each of the focal lengths to be displayed on each of the virtual screens, and thus, when the focus point of the user is focused on any one of the virtual screens, the user can accurately view the continuous display object.

(5) In the head-mounted display apparatus according to the exemplary embodiment, in the display unit, a first virtual screen for a first display object representing a first object to be displayed and a second virtual screen for displaying a second display object representing a second object to be displayed are set; the head-mounted display apparatus may further include an intermediate distance image generation unit configured to generate an intermediate distance display image for displaying the display object representing an object to be displayed present between the first object to be displayed and the second object to be displayed as viewed in the direction of the field of view, onto the virtual screen;

the intermediate distance image generation unit may combine a color of the first display object and a color of the second display object and generate the intermediate distance display image of the resultant color; and the display controller may cause at least one of the first virtual screen and the second virtual screen to display the generated intermediate distance display image.

According to the head-mounted display apparatus based on the exemplary embodiment, the color of the first display object and the color of the second display object are combined, the intermediate distance display image of the resultant color is generated, and the intermediate distance display image is displayed on at least one of the first virtual screen and the second virtual screen, and thus, the user can accurately view the intermediate distance display image when at least one of the first virtual screen and the second virtual screen is fixated on.

(6) The head-mounted display apparatus according to the exemplary embodiment may further include: a line-of-sight detection unit configured to detect a line of sight of the user; and a point-of-fixation distance calculation unit configured to calculate, from the detected line of sight, a point-of-fixation distance that is a distance between the user and a point of fixation upon which the user fixates. The distance-specific image generation unit may generate the distance-specific display images by utilizing the calculated point-of-fixation distance; and the display controller may cause the virtual screen corresponding to the point-of-fixation distance to display the distance-specific display images generated by utilizing the point-of-fixation distance.

According to the head-mounted display apparatus based on the exemplary embodiment, the calculated point-of-fixation distance is utilized to generate the distance-specific display images, and the distance-specific display images generated by utilizing the point-of-fixation distance are displayed on the virtual screen corresponding to the point-of-fixation distance, and thus, even when the user changes the point of fixation, a deviation in focal length and a deviation in angle of convergence may not be easily generated.

Various embodiments of the invention may be implemented. For example, the invention may be achieved in various embodiments including a display control method for a head-mounted display apparatus, a computer program configured to provide the display control method, and a recording medium storing the computer program.

The present application is based on and claims priority from JP Application Serial Number 2018-045023, filed Mar. 13, 2018, the disclosure of which is hereby incorporated by reference herein in its entirety.

What is claimed is:

1. A head-mounted display apparatus, comprising:
a display that functions as a display unit that displays each of virtual screens that is set to each of a plurality of predetermined focal lengths;
a sensor that functions as a line-of-sight detection unit that detects a line of sight of a user wearing the head-mounted display apparatus; and
a processor that functions as:
a distance-specific image generation unit that generates distance-specific display images for displaying, on the virtual screens, a display object representing an object to be displayed present between two focal lengths next to each other of the plurality of focal lengths;
a display controller that displays each of the generated distance-specific display images on the virtual screen; and
a point-of-fixation distance calculation unit that calculates, from the detected line of sight, a point-of-fixation distance that is a distance between the user and a point of fixation upon which the user fixates, wherein
the distance-specific image generation unit generates the distance-specific display images by utilizing the calculated point-of-fixation distance, and
the display controller causes each of the virtual screens corresponding to the point-of-fixation distance to display the distance-specific display images generated by utilizing the point-of-fixation distance.

2. The head-mounted display apparatus according to claim 1, wherein
when a plurality of the display objects overlap as viewed in a direction of a field of view of the user, the display controller does not cause at least a portion of the display object located far in the direction of the field of view, out of the plurality of display objects, to be displayed.

3. The head-mounted display apparatus according to claim 1, wherein
the display controller displays an entirety of a continuous display object that is the display object representing an object to be displayed present continuously over a plurality of the focal lengths, onto the virtual screen corresponding to a focal length closest to the point-of-fixation distance, of the plurality of the focal lengths.

4. The head-mounted display apparatus according to claim 1, wherein
the display controller divides, for each of the focal lengths, a continuous display object that is the display object representing an object to be displayed present continuously over a plurality of the focal lengths to display the continuous display object on each of the virtual screens.

5. The head-mounted display apparatus according to claim 1, wherein
in the display unit, a first virtual screen for displaying a first display object representing a first object to be displayed and a second virtual screen for displaying a second display object representing a second object to be displayed are set,
the processor further functions as an intermediate distance image generation unit that generates an intermediate distance display image for displaying the display object representing an object to be displayed present between the first object to be displayed and the second object to be displayed as viewed in a direction of a field of view of the user, onto the virtual screen, wherein,
the intermediate distance image generation unit combines a color of the first display object and a color of the second display object and generates the intermediate distance display image of the resultant color, and
the display controller causes at least one of the first virtual screen and the second virtual screen to display the generated intermediate distance display image.

6. A head-mounted display apparatus, comprising:
a display that functions as a display unit that displays each of virtual screens that is set to each of a plurality of predetermined focal lengths;
a sensor that functions as a line-of-sight detection unit that detects a line of sight of a user wearing the head-mounted display apparatus; and
a processor that functions as:
a distance-specific image generation unit that generates distance-specific display images for displaying, on the virtual screens, a display object representing an object to be displayed present between two focal lengths next to each other of the plurality of focal lengths;
a display controller that displays each of the generated distance-specific display images on the virtual screen; and
a point-of-fixation distance calculation unit that calculates, from the detected line of sight, a point-of-fixation distance that is a distance between the user and a point of fixation upon which the user fixates, wherein
the display controller displays a continuous display object that is the display object representing an object to be displayed present continuously over a plurality of the focal lengths, onto the virtual screen corresponding to a focal length closest to the point-of-fixation distance, of the plurality of the focal lengths.

7. A display control method for a head-mounted display apparatus including a display that displays each of virtual screens that is set to each of a plurality of predetermined focal lengths, the method comprising:
generating distance-specific display images for displaying, on the virtual screens, a display object representing an object to be displayed present between two focal lengths next to each other of the plurality of focal lengths;
displaying each of the generated distance-specific display images on the virtual screen;
detecting a line of sight of a user wearing the head-mounted display apparatus;
calculating, from the detected line of sight, a point-of-fixation distance that is a distance between the user and a point of fixation upon which the user fixates, wherein the generating of the distance-specific display images is by utilizing the calculated point-of-fixation distance; and causing each of the virtual screens corresponding to the point-of-fixation distance to display the distance-specific display images generated by utilizing the point-of-fixation distance.

\* \* \* \* \*